(12) United States Patent
Barton et al.

(10) Patent No.: US 12,400,182 B2
(45) Date of Patent: Aug. 26, 2025

(54) SYSTEMS AND METHODS FOR AUTO-REPLENISHMENT OF PRODUCTS USING PRESSURE MAPPING SENSORS AND MACHINE LEARNING

(71) Applicant: Walmart Apollo, LLC, Bentonville, AR (US)

(72) Inventors: Elizabeth J. Barton, East Setauket, NY (US); Soren A. Larson, New York, NY (US); Soheil Salehian-Dardashti, Brooklyn, NY (US); Victoria A. Moeller-Chan, Brooklyn, NY (US)

(73) Assignee: Walmart Apollo, LLC, Bentonville, AR (US)

( * ) Notice: Subject to any disclaimer, the term of this patent is extended or adjusted under 35 U.S.C. 154(b) by 0 days.

(21) Appl. No.: 18/381,497

(22) Filed: Oct. 18, 2023

(65) Prior Publication Data

US 2024/0054453 A1 Feb. 15, 2024

Related U.S. Application Data

(63) Continuation of application No. 17/459,732, filed on Aug. 27, 2021, now abandoned.
(Continued)

(51) Int. Cl.
*G06Q 10/087* (2023.01)
*F25D 9/00* (2006.01)
(Continued)

(52) U.S. Cl.
CPC ............ *G06Q 10/087* (2013.01); *F25D 9/00* (2013.01); *G01G 19/52* (2013.01); *G06N 20/00* (2019.01);
(Continued)

(58) Field of Classification Search
CPC .. G06Q 10/087; G06Q 20/208; G06Q 20/203; G06Q 30/0639; G06Q 10/08
See application file for complete search history.

(56) References Cited

U.S. PATENT DOCUMENTS

| 6,204,763 B1 * | 3/2001 | Sone ................... G06Q 10/087 340/5.1 |
| 9,279,611 B2 | 3/2016 | Tan |

(Continued)

FOREIGN PATENT DOCUMENTS

CN 110031074 A 7/2019

OTHER PUBLICATIONS

Inventory Planning for SAP Business One Valogic, LLC, 2017 (Year: 2018).
(Continued)

*Primary Examiner* — Scott L Jarrett
(74) *Attorney, Agent, or Firm* — Fitch, Even, Tabin & Flannery, LLP

(57) ABSTRACT

Systems and methods for identifying, tracking usage of, and replenishing products on a shelf of a product storage unit include a pressure sensor array positioned on the shelf and configured to detect forces exerted on the pressure sensor array by each of the products located on the shelf. An electronic database stores reference pressure array data representative of a reference pressure data model relative to each of the products. A computing device obtains a pressure data set associated with a product that was captured by the pressure sensor array when the product was positioned on the pressure sensor array, and correlates the pressure data set associated with the product with the reference pressure array data stored in the electronic database to determine an identity of the product and a consumption level of the (Continued)

product, automatically replenishing the product when consumption of the product is above a set threshold.

16 Claims, 8 Drawing Sheets

Related U.S. Application Data

(60) Provisional application No. 63/071,001, filed on Aug. 27, 2020.

(51) Int. Cl.
*G01G 19/52* (2006.01)
*G06N 20/00* (2019.01)
*G06Q 10/0631* (2023.01)
*G06Q 30/0201* (2023.01)
*G06Q 30/0601* (2023.01)

(52) U.S. Cl.
CPC ... *G06Q 10/06315* (2013.01); *G06Q 30/0201* (2013.01); *G06Q 30/0617* (2013.01); *G06Q 30/0637* (2013.01); *F25D 2700/06* (2013.01)

(56) References Cited

U.S. PATENT DOCUMENTS

| | | | |
|---|---|---|---|
| 9,805,360 B1 | 10/2017 | Jaber | |
| 9,922,530 B2* | 3/2018 | Wu | G06Q 10/087 |
| 10,121,121 B1 | 11/2018 | De Bonet | |
| 10,262,294 B1 | 4/2019 | Hahn | |
| 10,268,983 B2* | 4/2019 | Kumar | G07G 1/0036 |
| 10,467,668 B2* | 11/2019 | Lauka | G06Q 30/0609 |
| 10,521,646 B2* | 12/2019 | Adato | G06Q 10/06311 |
| 10,548,418 B2 | 2/2020 | Gentile | |
| 10,664,795 B1 | 5/2020 | Worley | |
| 10,713,614 B1 | 7/2020 | Manyam | |
| 10,845,258 B2 | 11/2020 | Cohen | |
| 10,853,761 B1 | 12/2020 | Bentley | |
| 10,977,671 B2* | 4/2021 | Jayan | H04L 67/306 |
| 11,164,226 B2* | 11/2021 | Gu | B65G 1/04 |
| 11,263,583 B1 | 3/2022 | Kumar | |
| 11,308,547 B2 | 4/2022 | Haulk | |
| 11,315,074 B2 | 4/2022 | Neubarth | |
| 11,361,011 B1 | 6/2022 | Lefkow | |
| 11,373,160 B2 | 6/2022 | Gu | |
| 11,436,557 B1 | 9/2022 | Kumar | |
| 11,450,011 B2 | 9/2022 | Wang | |
| 11,468,400 B1 | 10/2022 | Kumar | |
| 11,488,103 B1 | 11/2022 | McDaniel | |
| 11,526,843 B2* | 12/2022 | Li | G06Q 30/0185 |
| 2002/0178066 A1 | 11/2002 | Roh | |
| 2005/0075954 A1 | 4/2005 | Matsumoto | |
| 2013/0256040 A1 | 10/2013 | Nybom | |
| 2013/0284806 A1* | 10/2013 | Margalit | G07G 1/0009 235/382 |
| 2015/0019391 A1 | 1/2015 | Kumar | |
| 2015/0041616 A1 | 2/2015 | Gentile | |
| 2015/0094825 A1 | 4/2015 | Kinoshita | |
| 2016/0132821 A1* | 5/2016 | Glasgow | G06Q 10/087 705/28 |
| 2016/0371667 A1* | 12/2016 | Adetunji | G06Q 20/208 |
| 2017/0053516 A1 | 2/2017 | Wu | |
| 2017/0169440 A1 | 6/2017 | Dey | |
| 2018/0046975 A1* | 2/2018 | Jones | G06Q 20/203 |
| 2018/0165711 A1 | 6/2018 | Montemayor | |
| 2018/0174212 A1 | 6/2018 | Lauka | |
| 2018/0181906 A1 | 6/2018 | Baduge | |
| 2018/0232689 A1 | 8/2018 | Minvielle | |
| 2018/0239319 A1 | 8/2018 | Abdoo | |
| 2018/0285902 A1* | 10/2018 | Nazarian | G06Q 30/0202 |
| 2018/0365630 A1 | 12/2018 | Seals | |
| 2019/0073627 A1 | 3/2019 | Nakdimon | |
| 2019/0102825 A1* | 4/2019 | Jaber | H04W 4/33 |
| 2019/0104864 A1 | 4/2019 | Barnet | |
| 2019/0145817 A1 | 5/2019 | Shim | |
| 2019/0149725 A1* | 5/2019 | Adato | H04N 1/00 348/158 |
| 2019/0205821 A1* | 7/2019 | Werner | G06F 18/2413 |
| 2019/0215424 A1* | 7/2019 | Adato | G06T 7/521 |
| 2019/0311319 A1 | 10/2019 | Cote | |
| 2020/0126097 A1 | 4/2020 | Jayan | |
| 2020/0383499 A1 | 12/2020 | Ting | |
| 2021/0000268 A1 | 1/2021 | Gentile | |
| 2021/0027238 A1 | 1/2021 | Nemeth | |
| 2021/0035192 A1 | 2/2021 | McBrady | |
| 2021/0056498 A1 | 2/2021 | Liu | |
| 2021/0073723 A1 | 3/2021 | Shakkour | |
| 2021/0124947 A1 | 4/2021 | Datar | |
| 2021/0224773 A1 | 7/2021 | Fazekas | |
| 2021/0278129 A1 | 9/2021 | Cote | |
| 2021/0287168 A1 | 9/2021 | Arora | |
| 2021/0342770 A1 | 11/2021 | Li | |
| 2021/0354914 A1 | 11/2021 | Wang | |
| 2021/0364226 A1 | 11/2021 | Park | |
| 2021/0374836 A1 | 12/2021 | Bronicki | |
| 2022/0067642 A1 | 3/2022 | Barton | |
| 2022/0211193 A1 | 7/2022 | Gentile | |
| 2022/0253796 A1 | 8/2022 | Kochan, II | |
| 2022/0373385 A1 | 11/2022 | Thunhorst | |

OTHER PUBLICATIONS

Oracle Retail Advanced Inventory Planning—Store and Warehouse Replenishment Planning User Guide for the RPAS Fusion Client, Release 14.1, Oracle, Dec. 2014 (Year: 2014).
SAP Forecasting and Replenishment SAP Inc., 2018 (Year: 2018).
USPTO; U.S. Appl. No. 17/459,732; Non-Final Rejection mailed Apr. 26, 2023; (pp. 1-22).
USPTO; U.S. Appl. No. 17/459,732; Notice of Allowance and Fees Due (PTOL-85) mailed Jul. 24, 2023; (pp. 1-15).
Smartretailsystems; "Smart Shelf—Smart Retail Systems"; <https://vimeo.com/345079208>; Jun. 28, 2019; pp. 1-6.
Smartretailsystems; "Smart Shelf Mat by Smart Retail Systems"; <https://vimeo.com/385586931>; Jan. 17, 2020; pp. 1-5.

\* cited by examiner

SYSTEMS AND METHODS FOR AUTO-REPLENISHMENT OF PRODUCTS USING PRESSURE MAPPING SENSORS AND MACHINE LEARNING

CROSS-REFERENCE TO RELATED APPLICATIONS

This application is a continuation of U.S. application. Ser. No. 17/459,732, filed Aug. 27, 2021, which claims the benefit of U.S. Prov. App. No. 63/071,001, filed Aug. 27, 2020, each of which is incorporated herein by reference in its entirety.

TECHNICAL FIELD

This disclosure relates generally to managing on-shelf product inventory, and in particular, to systems and methods for identifying and replenishing on-shelf product inventory.

BACKGROUND

Monitoring on-shelf inventory and replenishing the on-shelf inventory, when necessary, to avoid the undesirable out of stock events and lost sales is very important to overall profitability of retail stores. It is common for workers of retail sales facilities to manually inspect product storage shelves to determine which of the products are adequately stocked, and which products are, or will soon be out of stock, and need to be replenished. Given the very large number of product storage shelves and products on the product display shelves at a typical retail facility, such manual on-shelf product inventory inspection by the workers and manual product replenishment order submission is time consuming and increases operational costs for the retail facility, since these workers could be performing other tasks if they were not involved manually inspecting product display shelves and products stocked thereon.

Retailers often look for ways to add to their profitability by facilitating product reorders by their customers. One way to do so would be to monitor the on-shelf inventory of products of the customers, track product usage by the customers, and automatically re-order the products for the customers to replenish the on-shelf inventory of the customers before the products are almost consumed or fully consumed by the customers.

A system for on-shelf inventory monitoring and auto-replenishment, both in a home and in a retail setting, would depend on effectively detecting and identifying the products located on shelves of product storage units (e.g., refrigerators, pantries, shelving cabinets, etc.). However, retailers typically offers for sale thousands of different products that come in all kinds of different shapes and sizes (with some products being very similar in overall shape and size), and most retailers currently do not have product recognition capabilities that would enable detection, recognition, and usage tracking of consumer products on a large scale required to make both on-shelf monitoring an exemplary user-side logic flow 1000 when the system 100 is in operation and product replenishment systems in retail and in-home settings effective.

BRIEF DESCRIPTION OF THE DRAWINGS

Disclosed herein are embodiments of systems and methods of system for identifying, tracking usage of, and replenishing products on a shelf of a product storage unit. This description includes drawings, wherein.

Figure 1:
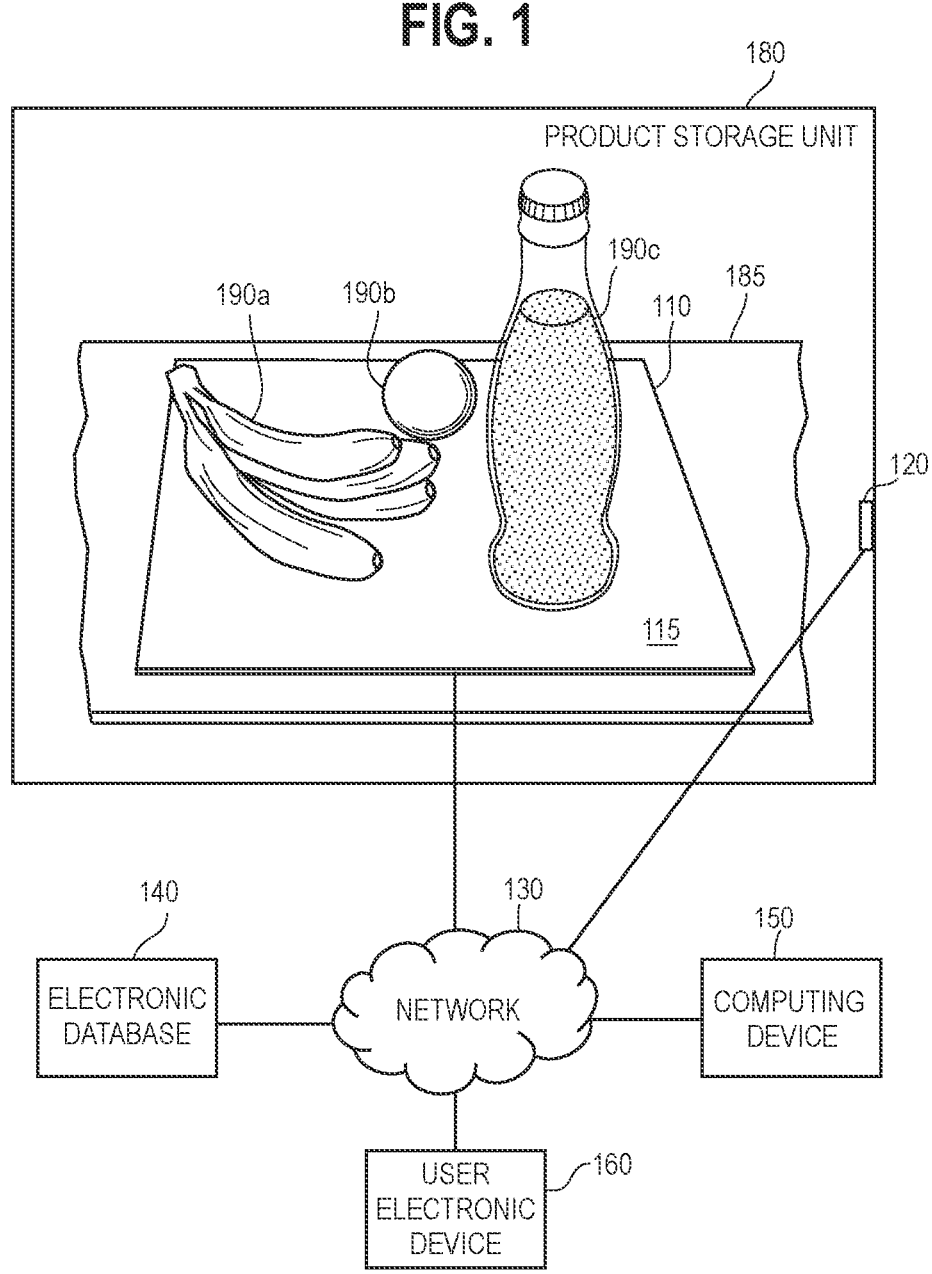
FIG. 1 is a diagram of a system of identifying, tracking usage of, and replenishing products on a shelf of a product storage unit in accordance with some embodiments, depicting a shelf of a product storage unit having a pressure sensor array thereon and several products located on the pressure sensor array.

Elements in the figures are illustrated for simplicity and clarity and have not been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. Certain actions and/or steps may be described or depicted in a particular order of occurrence while those skilled in the art will understand that such specificity with respect to sequence is not actually required.

The terms and expressions used herein have the ordinary technical meaning as is accorded to such terms and expressions by persons skilled in the technical field as set forth above except where different specific meanings have otherwise been set forth herein.

DETAILED DESCRIPTION

The following description is not to be taken in a limiting sense, but is made merely for the purpose of describing the general principles of exemplary embodiments. Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Generally, systems and methods for identifying, tracking usage of, and replenishing products on a shelf of a product storage unit include a pressure sensor array positioned on the shelf and configured to detect forces exerted on the pressure sensor array by each of the products located on the shelf. The pressure values exerted by the products onto the pressure sensor array are converted to images that have a pressure mapping (e.g., dot matrix map, color map, or the like) representative of the pressure that was detected to be exerted by each of the products on the pressure sensor array. The pressure maps for the individual products are then stored in an electronic database as reference pressure array data, and a computer vision model is trained to identify the products using the reference pressure data stored in the electronic database. A computing device obtains a pressure data set associated with a product that was captured by the pressure sensor array when the product was positioned on the pressure sensor array, and uses the trained computer vision model to determine an identity of the product and a consumption level of the product. The computing device automatically replenishes the inventory of a given product by triggering a reorder of that product when consumption of the product is above a set threshold.

In some embodiments, a system for identifying, tracking usage of, and replenishing products on a shelf of a product storage unit includes a pressure sensor array positioned on the shelf and configured to detect forces exerted on the pressure sensor array by each of the products located on the shelf, and an electronic database configured to store reference pressure array data representative of a reference pressure data model relative to each of the products. The reference pressure data model for a selected one of the products includes pressure data generated on the pressure sensor array by a reference product substantially identical to the selected one of the products when the reference product is at various consumption levels (e.g., empty, half-full, full, etc.). Each reference pressure data model is associated in the electronic database with product identity data that identifies a product corresponding to the reference pressure data model. The system further includes a computing device in communication with the pressure sensor array and the electronic database. The computing device includes a processor-based control circuit configured to: obtain a pressure data set associated with the selected one of the products and captured by the pressure sensor array when the selected one of the products was positioned on the pressure sensor array and correlate the pressure data set associated with the selected one of the products with the reference pressure array data stored in the electronic database to determine whether the reference pressure array data stored in the electronic database includes a reference pressure data model that matches the pressure data set associated with the selected one of the products. If a correlation of the pressure data set associated with the selected one of the products with the reference pressure array data stored in the electronic database indicates a match between the pressure data set associated with the selected one of the products and one of the reference pressure data models stored in the electronic database, then the computing device obtains the product identity data stored in the electronic database in association with the one of the reference pressure data models that matches the pressure data set associated with the selected one of the products, and determines an identity of the selected one of the products based on the product identity data obtained from the electronic database.

In some embodiments, a method for identifying, tracking usage of, and replenishing products on a shelf of a product storage unit includes: providing a pressure sensor array positioned on the shelf and configured to detect a force exerted on the pressure sensor array by each of the products located on the shelf and providing an electronic database configured to store reference pressure array data representative of a reference pressure data model relative to each of the products, with the reference pressure data model for a selected one of the products including pressure data generated on the pressure sensor array by a reference product substantially identical to the selected one of the products when the reference product is at a plurality of consumption levels, and with each reference pressure data model being associated in the electronic database with product identity data that identifies a product corresponding to the reference pressure data model. The method further includes providing a computing device including a processor-based control circuit in communication with the pressure sensor array and the electronic database; obtaining, by the computing device, a pressure data set associated with the selected one of the products and captured by the pressure sensor array when the selected one of the products was positioned on the pressure sensor array; correlating the pressure data set associated with the selected one of the products with the reference pressure array data stored in the electronic database to determine whether the reference pressure array data stored in the electronic database includes a reference pressure data model that matches the pressure data set associated with the selected one of the products; and if a correlation of the pressure data set associated with the selected one of the products with the reference pressure array data stored in the electronic database indicates a match between the pressure data set associated with the selected one of the products and one of the reference pressure data models stored in the electronic database, by the control circuit of the computing device: obtaining the product identity data stored in the electronic database in association with the one of the reference pressure data models that matches the pressure data set associated with the selected one of the products; and determining an identity of the selected one of the products based on the product identity data and product location data obtained from the electronic database.

FIG. 1 shows an embodiment of a system 100 of facilitating monitoring and auto-replenishment of products using pressure mapping sensors and machine learning. The system 100 includes a pressure sensor array 110 positioned on a shelf 185 of a product storage unit 180 (e.g., refrigerator, freezer, cabinet, cupboard, pantry of a customer of a retailer, or shelving unit/product display structure at a facility of a retailer). The system 100 is shown in FIG. 1 for simplicity of illustration with only one pressure sensor array 110 on one shelf 185 of one product storage unit 180 having only three different consumer products 190a-190c thereon, but it will be appreciated that the system 100 may include dozens/hundreds/thousands pressure sensor arrays 110 on dozens/hundreds/thousands of shelves 185 of product storage units 180 at any number of facilities operated by a retailer and any number of homes/businesses of customers of the retailer.

Figure 11:
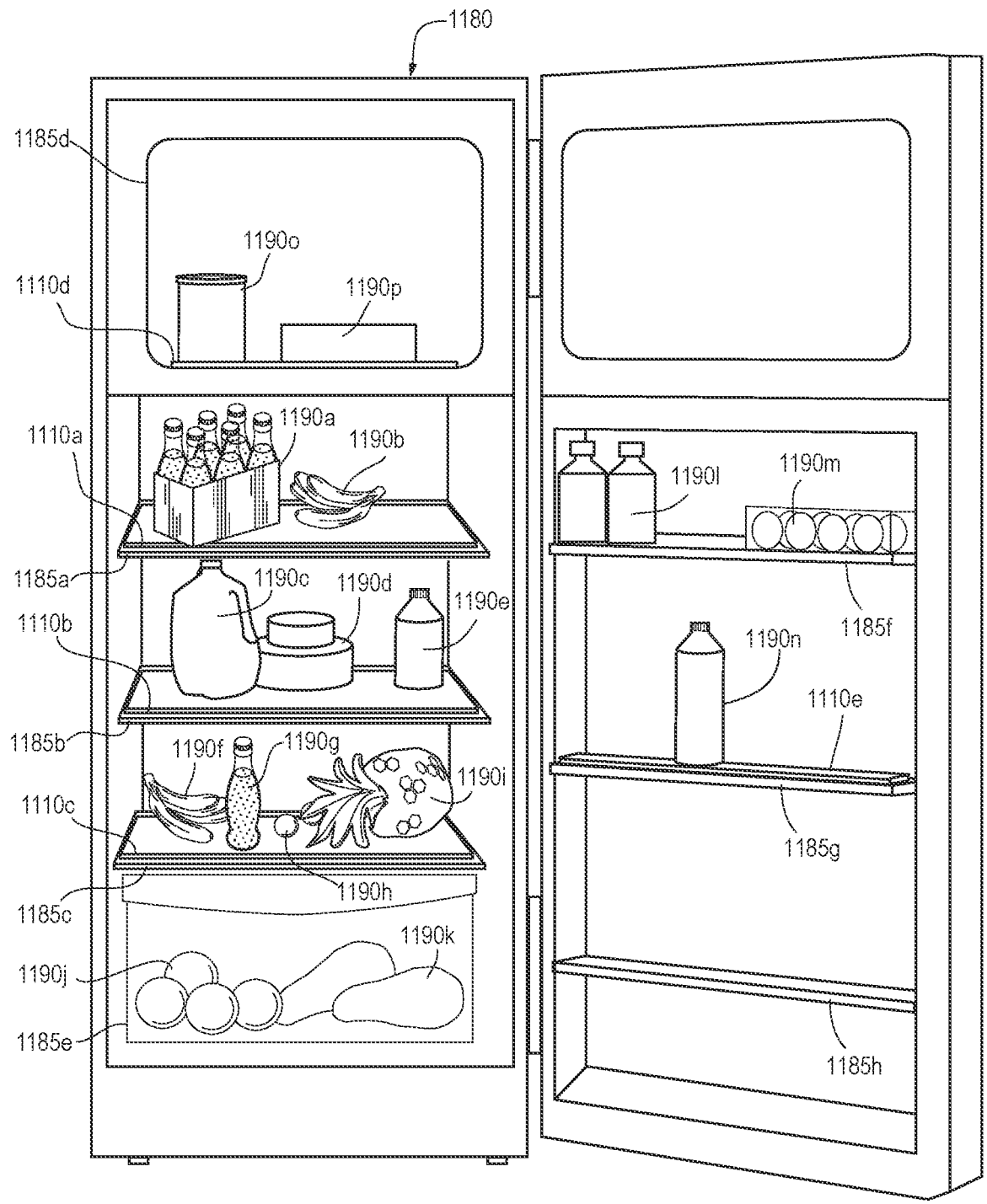
FIG. 11 is an exemplary product storage unit in the form of refrigerator including both product storage compartments and product storage shelves having pressure sensor arrays thereon, and products located on the pressure sensor arrays.

For example, an exemplary product storage unit 1180 in the form of a refrigerator is illustrated in FIG. 11. The exemplary storage unit 1180 may be a refrigerator in a home of a customer of the retailer, a refrigerator in a business of a customer of the retailer, or a refrigerator located at a facility of a retailer. As can be seen in FIG. 11, the exemplary refrigerator 1180 includes three product storage shelves 1185a-c in the main compartment, a freezer compartment 1185d, a storage compartment 1185e, and three product storage shelves 1185f-h on the door. In the embodiment depicted in FIG. 11, each of shelves 1185a-c includes a pressure sensor array 1110a-c thereon, such that the products 1190a-1190i located on their respective shelves 1185a-c are positioned on their respective pressure sensor arrays 1110a-c. Of the shelves 1185f-h on the refrigerator door, only the shelf 1185g is shown with a pressure sensor array 1110e with a product 1190n positioned thereon, but it will be appreciated that the other shelves 1185f and 1185h may have pressure sensor arrays thereon. Notably, while the storage area 1185e in the main compartment of the refrigerator has products 1190j and 1190k stored therein, but does not include a shelf or a pressure sensor array therein, it will be appreciated that refrigerator storage areas other than shelves may also include a pressure sensor array. For example, FIG. 11 shows that the freezer compartment 1185d of the exemplary refrigerator 1180 includes a pressure sensor array 1110d with products 1190o and 1190p located on the pressure sensor array 1110d.

In some embodiments, customers opt-in (e.g., using a website or a mobile application) for a service that monitors and auto-replenishes products in their home/business. The systems and methods described herein can be configured to comply with privacy requirements which may vary between jurisdictions. For example, before any recording, collection, capturing or processing of customer data, a "consent to capture" process may be implemented. In such a process, consent may be obtained, from the customer, via a registration process. Part of the registration process may be to ensure compliance with the appropriate privacy laws for the location where the service would be performed. The registration process may include certain notices and disclosures made to the customer prior to the customer giving consent. In other words, the exemplary systems and methods described herein provide for no unauthorized/unconsented to collection or processing of data of customers.

In some embodiments, after registration, and before collection or processing of customer data, the system verifies that the customer as registered with the system and has provided the required consent for data collection. That is, the customer's registration status as having consented to the collection of the customer's data can be verified by the system prior to collecting any customer data. In some embodiments, once consent is verified, customer data can be captured, processed and used. Absent verification of consent, the customer data collection features of the system remain inactive. Once consent is verified, customer data collection features of the system may be activated. In some aspects, if the system detects that customer data was inadvertently collected from the customer prior to verification of that customer's consent to the data collection, such collected data is immediately deleted, not having been saved to disk.

In some embodiments, customer data captured as part of the verification process is handled and stored by a single party at a single location. In some aspects, where data must be transmitted to an offsite location for verification, certain disclosures prior to consent are required, and the customer data is encrypted. The hashing of the customer data received is a form of asymmetrical encryption which improves both data security and privacy, as well as reducing the amount of customer data which needs to be communicated. In some embodiments, the data being shared by the user can be changed by the user at any time. In one aspect, after the user opts in to share data, the user receives a notification of the active sharing relationship, for example, what information is being shared and how it will be used, as well as information on how to review and manage the user's active and inactive data sharing relationships. In some embodiments, the specifics of all active and inactive data sharing relationships of the user are provided to the user for review and/or modification within a data sharing relationship management interface.

The exemplary pressure sensor array 110 in FIG. 1 is a pressure mat that covers at least a portion of the shelf 185, preferably, the entire shelf 185. It will be appreciated that the pressure sensor array 110 does not have to be a pressure mat, and that any other suitable alternative to a pressure mat may be used. As used herein, a pressure mat is a matrix of pressure sensors (i.e., "sensels") that quantifies an interface pressure between surfaces. Generally, pressure mats vary in overall size, sensel size, configuration, sensitivity, and accuracy, and better performance (i.e., higher accuracy) is typically associated with smaller sensel size. In some embodiments, the pressure sensor array 110 is configured to communicate via a network 130 with a computing device 150, which will be described in more detail below.

The pressure sensor array 110 includes a support surface 115 for supporting one or more consumer products 190 thereon. Exemplary products 190 may include, but are not limited to, any general-purpose consumer goods, as well as consumable products, such as food/grocery/beverage items, medications, and dietary supplements. The product support surface 115 may comprise materials including but not limited to film, rubber, foam, and the like, thereby providing a protecting surface to the pressure sensors of the pressure sensor array 110, and facilitating a better distribution of pressure across the pressure mat.

Generally, the products 190a-190c located on the pressure sensor array 110 exert a downward force/pressure onto the sensels where the exterior surface of the products 190a-190c makes contact with the pressure sensor array 110, and the sensels that are contacted by the products 190a-190c take on positive pressure values. Notably, it is not uncommon for products 190a-190c to exert non-uniform pressure onto the surface of the pressure sensor array 110, with some sensels of the pressure sensor array 110 taking on larger values than others. For example a carton of a dozen eggs from which four eggs have been removed would exert a heavier pressure in regions where eggs still remain and lighter pressure in regions where the eggs have been removed.

In some embodiments, as will be described in more detail below, the pressure sensor array 110 generates pressure readings by detecting and measuring forces exerted onto it by products 190a-190c located on the shelf 185 which the pressure sensor array 110 covers. In some embodiments, the readings of the pressure sensor array 110 comprise an m×n matrix of non-negative real valued numbers, with each (i,j) elements $0 \leq i \leq m$, $0 \leq j \leq n$ representing the amount of pressure sensed by a sensing element "sensel" of the pressure sensor array 110. In certain implementations, as will be described in more detail below, the computing device is configured to convert this m×n matrix of pressure data into a pressure image, where each pressure value $p\_\{i, j\}$ at matrix element (i,j) is converted to a color (or light-dark dot matrix) from 0 to a maximum pressure value $p\_max$, where $p\_max$ varies with pressure sensor hardware and pressure unit (e.g., psi or mmHg). In some embodiments, the pressure values may be optionally converted such that each pressure value is converted into a red/green/blue colormap, which makes it easier to visualize the pressure image. While this step is not required for computer vision training, it can help depending on the chosen algorithm by minimizing the pressure value quantization enforced by the computer vision routine.

In certain embodiments, the pressure sensor array 110 may be configured (e.g., activated by a control signal from a controller 120 (which will be discussed below) to generate pressure readings at a constant rate over time (e.g., 1 reading per minute, 1 reading per 5 minutes, 1 reading per 15 minutes, etc.), regardless of whether or not a user placed products 190a-190c onto the pressure sensor array 110, or removed products 190a-190c from the pressure sensor array 110 in the interval. In some aspects, the pressure sensor array 110 is activated by the controller 120 to generate a pressure reading based on a predefined input (e.g., when a light sensor operatively coupled to the pressure sensor array 110 and/or computing device 150 senses light, indicating that the refrigerator door is open).

In some embodiments, the system 100 further includes a controller 120 that may include one or more sensors configured to detect the presence and/or movement of an object (e.g., any one of products 190a-190c, a hand of a user, a door of a refrigerator, etc.) in the product storage unit 180. In some aspects, the controller 120 can include one or more sensors including but not limited to a motion-detecting sensor, an optical sensor, a photo sensor, an infrared sensor, a 3-D sensor, a depth sensor, a digital camera sensor, a mobile electronic device (e.g., a cell phone, tablet, or the like), a quick response (QR) code sensor, a radio frequency identification (RFID) sensor, a near field communication (NFC) sensor, a stock keeping unit (SKU) sensor, a barcode (e.g., electronic product code (EPC), universal product code (UPC), European article number (EAN), global trade item number (GTIN)) sensor, or the like. In some embodiments, the controller 120 may be configured to scan an identifying indicia (e.g., two dimensional barcode, RFID, NFC identifier, ultra-wideband (UWB) identifier, Bluetooth identifier, image, etc.) of the consumer products 190a-190c that are detected by the controller 120, and, based on a scan of the identifier of the consumer product 190 by the controller 120, to generate product identity data, which may then be transmitted to an electronic database 140 (which will be discussed in more detail below) for storage, or to the computing device 150 for processing and/or analysis.

As will be described in more detail below, in some embodiments, the pressure readings generated by the pressure sensor array 110 when products 190a-190c are located thereon are transmitted by the pressure sensor array 110 over a network 130 to an electronic database 140 and/or to a computing device 150. In some aspects, the computing device 150 (or a separate image processing cloud-based service module) is configured to: (1) process the pressure data values generated by the pressure sensor array 110, in response to placement of products 190a-190c thereon, to generate one or more images where the pressure values associated with the products 190a-190c are converted to a color map, a dot matrix map, or the like (see FIG. 2); (2) detect (i.e., localize) each consumer product 190a-190c in the image by generating a virtual boundary line 188a-188c to surround each one of the consumer products 190a-190c detected on the pressure sensor array 110 (see FIG. 3); and (3) for each virtual boundary line 188a-188c generated, train a computer vision model to create one or more reference model images for each of the consumer products 190a-190c to facilitate the identification of the consumer products 190a-190c using the resulting reference model images.

It will be appreciated that the system 100 is not limited to generating a database of reference pressure data only for consumer products 190, but could be advantageously used for building a pressure data database for certain objects that are not generally considered to be products offered for sale to consumers by retailers. In addition, while the systems and methods herein are described with reference to consumer product detection and identification in the context of monitoring and automatic replenishment of on-shelf inventory at facilities of retailers and in homes/businesses of the customers of the retailers, it will be appreciated that the consumer product detection and identification methods and systems described herein can be used for consumer product detection and recognition in other contexts, e.g., self-checkout terminals, slippage, omni-immersion, etc.

With reference to FIG. 1, the exemplary system 100 includes an electronic database 140. In some embodiments, the electronic database 140 and the computing device 150 may be implemented as two separate physical devices. It will be appreciated, however, that the computing device 150 and the electronic database 140 may be implemented as a single physical device. In some aspects, the electronic database 140 may be stored, for example, on non-volatile storage media (e.g., a hard drive, flash drive, or removable optical disk) internal or external to the computing device 150, or internal or external to computing devices distinct from the computing device 150. In some embodiments, the electronic database 140 may be cloud-based.

Generally, the exemplary electronic database 140 of FIG. 1 is configured to store data associated with pressure values and identities of the consumer products 190a-190c detected by the pressure sensor array 110 when the products 190a-190c are located on the pressure sensor array 110 and the shelf 185 of the product storage unit 180. Some exemplary electronic data that may be stored in the electronic database 140 includes but is not limited to: (1) electronic data corresponding to unique identifiers of the consumer products 190a-190c (e.g., which may be captured by the sensors of the controller 120 from the exterior of the consumer products 190a-190c), which may be associated in the electronic database 140 with the electronic data representing the pressure values detected in association with the corresponding products 190a-190c; (2) electronic data corresponding to pressure values generated by the pressure sensor array 110 when the products 190a-190c are located thereon; (3) electronic data corresponding to the images transformed/converted from the pressure data and including color maps/dot matrix maps of the consumer products 190a-190c detected by the pressure sensor array 110; (4) electronic data corresponding to the images including the color maps/dot matrix maps of the consumer products 190a-190c (at a variety of orientations and fill levels) detected by the pressure sensor array 110 and further including virtual bounding lines 188a-188c surrounding each of the consumer products 190a-190c; (5) reference pressure data models and virtual bounding line models trained by the computing device 150 and/or a cloud-based computer vision application programming interface (API) for a variety of consumer products 190a-190c at a variety of consumption/fill levels; (6) electronic data representative of unit weight/volume/quantity/morphology of each of the products 190a-190c; and (7) electronic data representative of the configuration of the pressure sensor array 110; (8) usage metadata, auto-replenishment profile, and product replenishment threshold settings associated with a user; and (9) electronic data representative of historical purchases (e.g., date purchased, number of units purchased, unit prices) of the products 190a-190c by the user.

The system 100 of FIG. 1 further includes a computing device 150 configured to communicate with the pressure sensor array 110, the controller 120, the electronic database 140, and the user electronic device 160 over a network 130. The exemplary network 130 depicted in FIG. 1 may be a wide-area network (WAN), a local area network (LAN), a personal area network (PAN), a wireless local area network (WLAN), Wi-Fi, Zigbee, Bluetooth (e.g., Bluetooth Low Energy (BLE) network), or any other internet or intranet network, or combinations of such networks. Generally, communication between various electronic devices of system 100 may take place over hard-wired, wireless, cellular, Wi-Fi or Bluetooth networked components or the like. In some aspects, one or more electronic devices of system 100 may include cloud-based features, such as cloud-based computer vision application programming interfaces (APIs) and cloud-based memory storage.

The computing device 150 may be a stationary or portable electronic device, for example, a desktop computer, a laptop computer, a tablet, a mobile phone, or any other electronic device including a control circuit (i.e., control unit) that includes a programmable processor. The computing device 150 may be configured for data entry and processing as well as for communication with other devices of system 100 via the network 130. The computing device 150 may be located at the same physical location as the electronic database 140, or may be located at a remote physical location relative to the electronic database 140.

In some embodiments, the system 100 includes one or more localized Internet-of-Things (IoT) devices and controllers in communication with the computing device 150. As a result, in some embodiments, the localized IoT devices and controllers can perform most, if not all, of the computational load and associated monitoring that would otherwise be performed by the computing device 150, and then later asynchronous uploading of summary data can be performed by a designated one of the IoT devices to the computing device 150, or a server remote to the computing device 150. In this manner, the computational effort of the overall system 100 may be reduced significantly. For example, whenever a localized monitoring allows remote transmission, secondary utilization of controllers keeps securing data for other IoT devices and permits periodic asynchronous uploading of the summary data to the computing device 150 or a server remote to the computing device 150.

Figure 8:
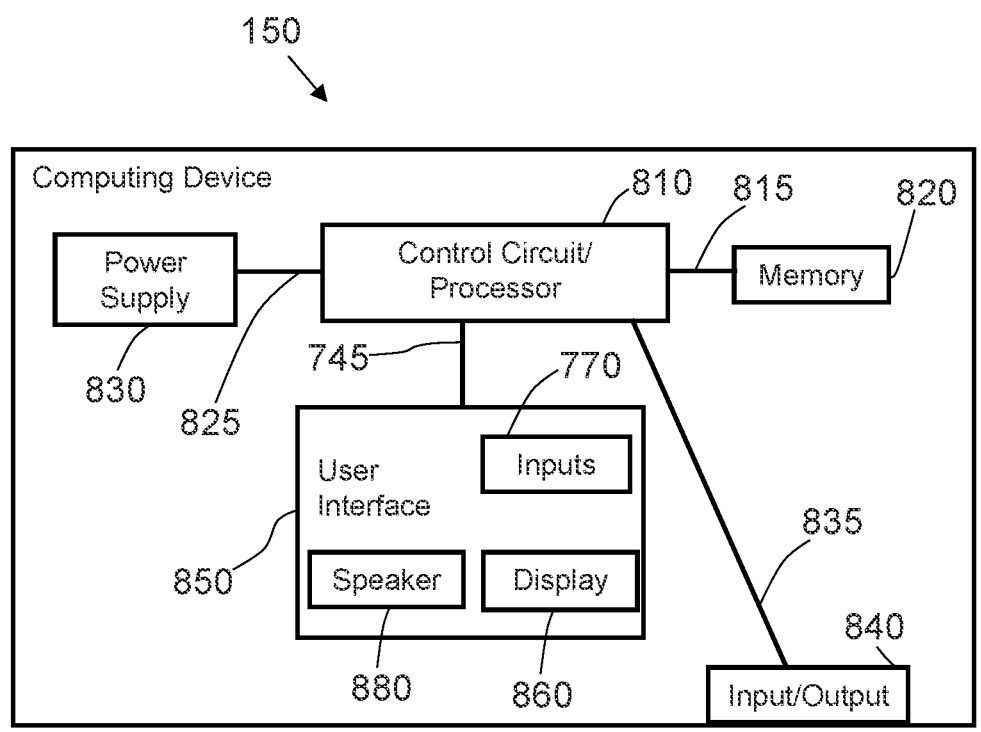
FIG. 8 is a functional diagram of an exemplary computing device usable with the system of FIG. 1 in accordance with some embodiments.

With reference to FIG. 8, the exemplary computing device 150 configured for use with exemplary systems and methods described herein may include a control circuit 810 including a programmable processor (e.g., a microprocessor or a microcontroller) electrically coupled via a connection 815 to a memory 820 and via a connection 825 to a power supply 830. The control circuit 810 can comprise a fixed-purpose hard-wired platform or can comprise a partially or wholly programmable platform, such as a microcontroller, an application specification integrated circuit, a field programmable gate array, and so on. These architectural options are well known and understood in the art and require no further description here.

The control circuit 810 can be configured (for example, by using corresponding programming stored in the memory 820 as will be well understood by those skilled in the art) to carry out one or more of the steps, actions, and/or functions described herein. In some embodiments, the memory 820 may be integral to the processor-based control circuit 810 or can be physically discrete (in whole or in part) from the control circuit 810 and is configured non-transitorily store the computer instructions that, when executed by the control circuit 810, cause the control circuit 810 to behave as described herein. (As used herein, this reference to "non-transitorily" will be understood to refer to a non-ephemeral state for the stored contents (and hence excludes when the stored contents merely constitute signals or waves) rather than volatility of the storage media itself and hence includes both non-volatile memory (such as read-only memory (ROM)) as well as volatile memory (such as an erasable programmable read-only memory (EPROM))). Accordingly, the memory and/or the control unit may be referred to as a non-transitory medium or non-transitory computer readable medium.

The control circuit 810 of the computing device 150 is also electrically coupled via a connection 835 to an input/output 840 that can receive signals from, for example, the pressure sensor array 110, the controller 120, the electronic database 140, and/or the user electronic device 160 (e.g., a hand-held electronic device of a worker of the retailer, a mobile electronic device of a customer of the retailer, etc.). The input/output 840 of the computing device 150 can also send signals to other devices, for example, a signal to the electronic database 140 to store and update reference pressure data models and reference boundary line models associated with consumer products 190a-190c. Also, a signal may be sent from the input/output 840 to an electronic device of the worker to task the worker with replenishing a shelf 185, or to an electronic device of a customer, indicating that a replenishment order for one or more consumer products 190a-190c is being processed for the costumer.

The processor-based control circuit 810 of the computing device 150 shown in FIG. 8 is electrically coupled via a connection 845 to a user interface 850, which may include a visual display or display screen 860 (e.g., LED screen) and/or button input 870 that provide the user interface 850 with the ability to permit an operator of the computing device 150 (e.g., worker at a the retail facility (or a worker at a remote control center) tasked with monitoring the inventory on the shelves 185 of the product storage unit 180) to manually control the computing device 150 by inputting commands via touch-screen and/or button operation and/or voice commands. Possible commands may, for example, cause the computing device 150 to cause transmission of an alert signal (e.g., to a user electronic device 160) indicating an actual or a forecasted out of stock event in association with one of the consumer products 190a-190c stocked on the shelf 185.

In some aspects, the manual control by an operator of the computing device 150 may be via the user interface 850 of the computing device 150, via another electronic device of the operator, or via another user interface and/or switch, and may include an option to modify/update the reference pressure data model generated by the control circuit 810 with respect to any of the products 190a-190c. In some embodiments, the user interface 850 of the computing device 150 may also include a speaker 880 that provides audible feedback (e.g., alerts) to the operator of the computing device 150. It will be appreciated that the performance of such functions by the processor-based control circuit 810 is not dependent on a human operator, and that the control circuit 810 may be programmed to perform such functions without a human operator.

Figure 9:
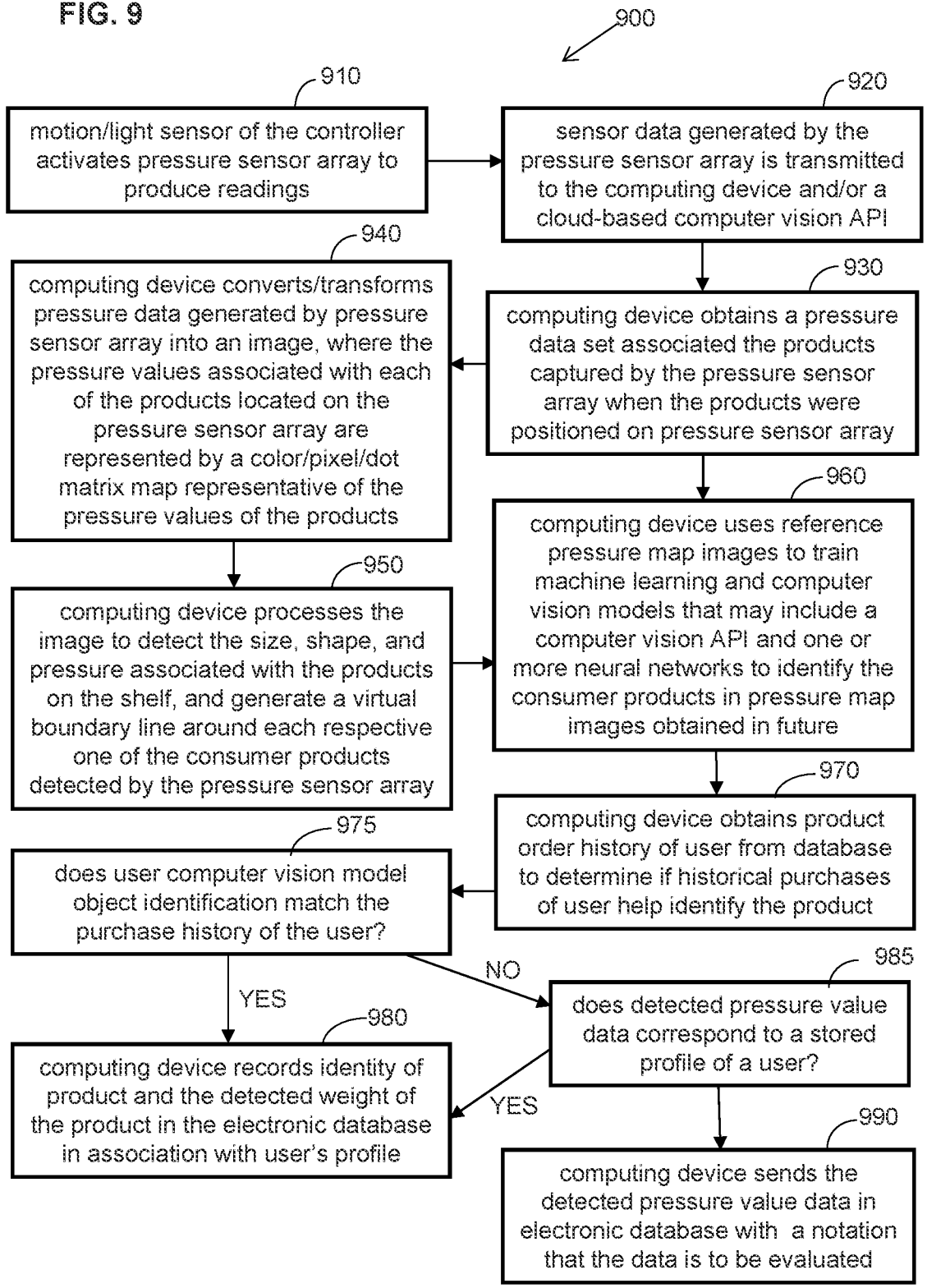
FIG. 9 is a flow chart diagram indicative of an exemplary logic flow of a system of identifying, tracking usage of, and replenishing products on a shelf of a product storage unit in accordance with some embodiments.

In some embodiments, the control circuit 810 of the computing device 150 functions in the logic flow 900 relating to the detection and identification of products 190a-190c on a shelf 185 of a product storage unit 180, generally shown by the flow chart depicted in FIG. 9. In particular, as mentioned above, the controller 120 may include one or more sensors configured to detect motion (e.g., placement of products 190a-190c onto the shelf 185 or removal of products 190a-190c from the shelf 185) and/or light (e.g., a light that turns on in response to a user opening a refrigerator). With reference to the exemplary embodiment shown in FIG. 9, when products are positioned by a user (e.g., a worker at a retail facility or a customer of a retailer) onto the pressor sensor array-equipped shelf 185 of the product storage unit 180 as shown in FIG. 1, at least one sensor of the controller 120 detects the associated event (hand and/or product movement, light, etc.), and transmits a signal that activates the pressure sensor array 110 to start producing pressure readings in response to the force exerted onto the pressure sensor array 110 by the products 190a-190c (step 910). The pressure values generated by the pressure sensor array 110 may then be transmitted (in a compressed or uncompressed form) by the pressure sensor array 110 to the electronic database 140 for storage and/or computing device 150 (or a cloud-based computer vision API) for processing (step 920).

With reference to FIG. 9, the computing device 150 is configured to obtain (e.g., from the pressure sensor array 110 or the electronic database 140, directly, or via a cloud-based computer vision model API) a pressure data set associated the products 190a-190c captured by the pressure sensor array 110 when the products 190a-190c were positioned on the pressure sensor array 110 (Step 930). In some embodiments, when the pressure data is obtained by the computing device 150, the control circuit 810 of the computing device 150 is programmed to analyze the received pressure data to identify significant sensor pressure changes that are associated with one or more of the products 190a-190c being placed onto or removed from the pressure sensor array-equipped shelf 185. In some aspects, based on analysis of one or more pressure data sets obtained by the computing device 150 from the pressure sensor array 110, the control circuit 810 of the computing device 150 is programmed to determine at least that: (1) one or more products 190a-190c is no longer positioned on the pressure sensor array 110; (2) one or more of the products 190a-190c was moved to a different location (relative to the location shown in FIG. 1) on the pressure sensor array 110; and/or (3) one or more of the products 190a-190c has been partially or fully consumed (e.g., the fill level of the product 190c (i.e., soft drink bottle) is no longer 100%, but only 50% or 25%; the product 190a no longer has 4 bananas, but only has two; the product 190b was half-consumed, so that only half an orange is left).

For example, in some aspects, the control circuit 810 is programmed to sum up the pressure values inside the virtual bounding line 188c in order to obtain the current fill level (e.g., 10%, 25%, 50%) of the product 190c (i.e., soft drink bottle). Similarly, in some aspects, the control circuit 810 is programmed to sum up the pressure values inside the virtual bounding line 188c in order to obtain a consumption level (e.g., all 4 bananas still present, 2 bananas remain, 1 banana remains) of the product 190a (i.e., bunch of bananas). In certain implementations, the control circuit 810 of the computing device 150 is programmed to transmit the pressure readings (e.g., at certain predetermined intervals, for example from 1 to 5 readings/frames per second) to the electronic database 140 for storage.

Figure 2:
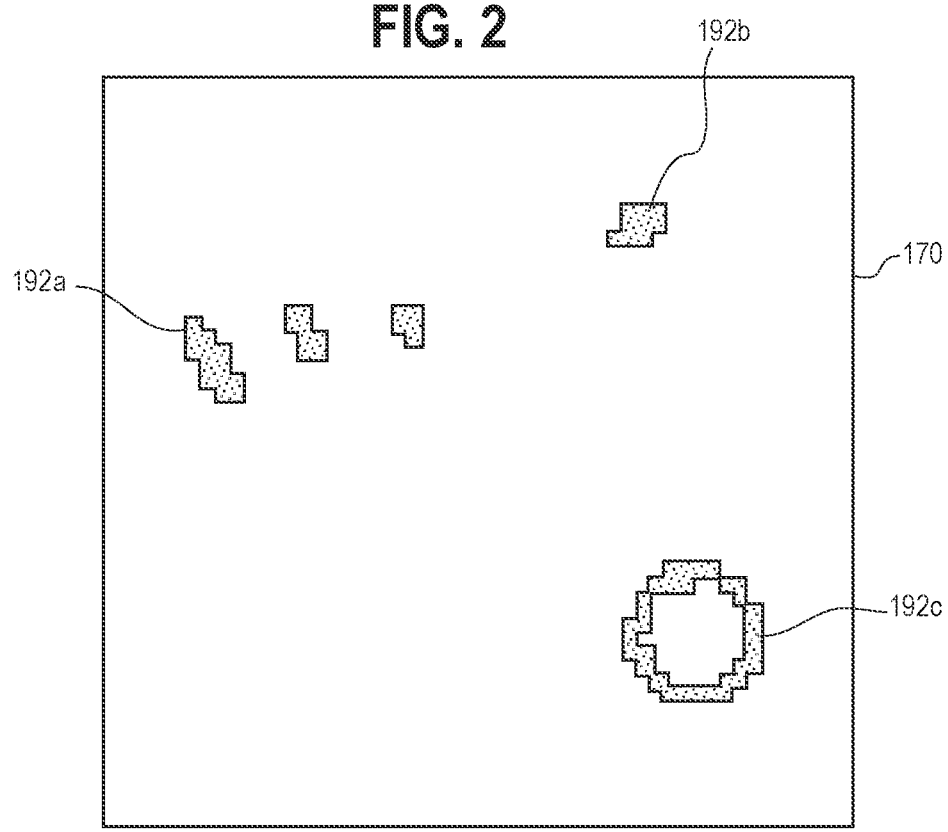
FIG. 2 depicts an exemplary image depicting dot matrix shapes representative of the pressure values exerted by the products of FIG. 1 onto the pressure sensor array of FIG. 1.

The exemplary logic flow 900 of FIG. 9 further includes the control circuit 810 of the computing device 150 converting/transforming the pressure data generated by the pressure sensor array 110 into machine readable code representative of an image, where the pressure values associated with each of the products 190a-190c located on the pressure sensor array 110 are represented by a color/pixel/dot matrix map, which may include a color/light-darkness scheme representative of the pressure value at a given point of the map (Step 940). FIG. 2 shows an exemplary image 170 depicting dot matrix shapes (which could also be a color-based pixel matrix), with the dot matrix shape 192a being a pressure map-like representation of the pressure values exerted by the product 190a (in the example shown in FIG. 1, bunch (hand) of bananas), the dot matrix shape 192b being representative of the pressure values exerted by the product 190b (in the example shown in FIG. 1, a single orange), and the dot matrix shape 192a being representative of the pressure values exerted by the product 190c (in the example shown in FIG. 1, a soft drink-containing 0.5 liter plastic bottle) onto the pressure sensor array 110 located on or built into the shelf 185. Generally, the dot matrix shapes 192a-192c contained within the boundary lines 188a-188c are representative of the sum of the pressure values indicated by the sensels of the pressure sensor array 110 in response to the pressure exerted by the products 190a-190c onto the pressure sensor array 110, such that the total sum of all of the pressure values contained within each of the boundary lines 188a-188c is proportional to the total weight of the respective product 190a-190c.

The exemplary image 170 of FIG. 2 depicts several dot matrices representative of several products 190a-190c. In certain implementations, the control circuit 810 of the computing device 150 is programmed to process the image 170 of FIG. 2 to detect (i.e., localize) each of the individual consumer products 190a-190c in the image 170. For example, in some aspects, the control circuit 810 of the computing device 150 is programmed to process the image 170 of FIG. 2 to detect the overall size, shape, and pressure levels associated with each one of the individual consumer products 190a-190c on the shelf 185 that are captured in the image 170. With reference to FIG. 9, in one aspect, the control circuit 810 of the computing device 150 delineates the individual products 190a-190c in the image 170 by generating a virtual boundary line 188a-188c around each respective one of the consumer products 190a-190c detected by the pressure sensor array 10 on the shelf 185 of the product storage unit 180, as shown in FIG. 3 (step 950).

Figure 3:
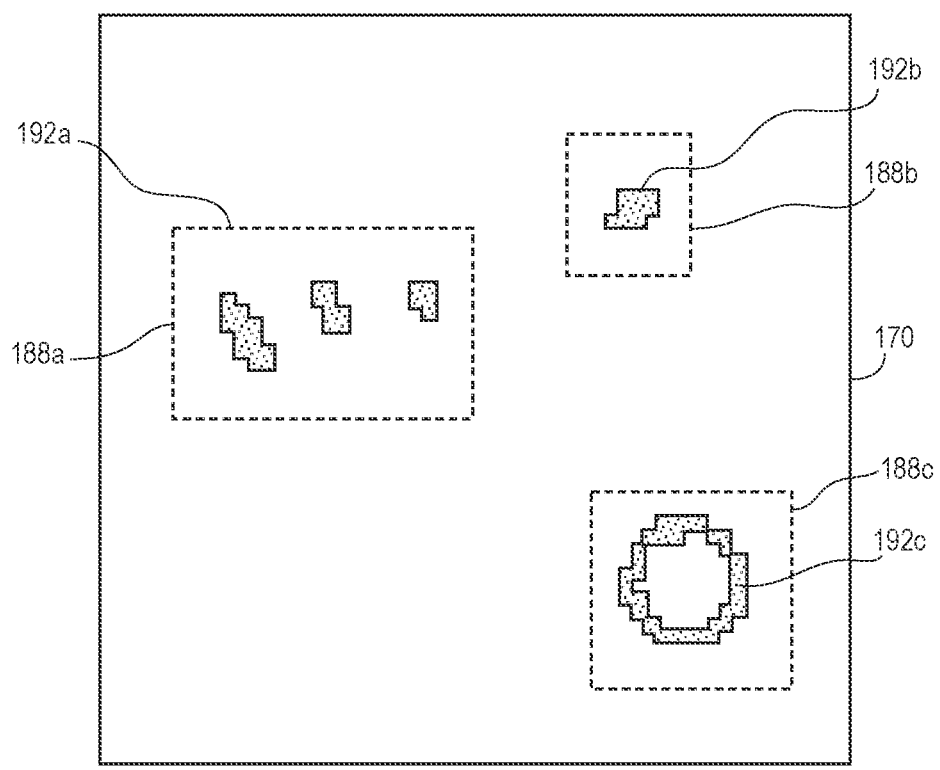
FIG. 3 depicts the image of FIG. 2, but further processed to include a virtual boundary line around each one of the dot matrix shapes representing an individual product.

In the exemplary image shown in FIG. 3, three different consumer products 190a-190c were detected by the control circuit 810 in the image 170, and each of the consumer products 190a-190c in the image 170 is surrounded by its own respective virtual boundary line 188a-188c. In some implementations, after the general outline of, and the pressure exerted by, each one of the consumer products 190a-190c onto the pressure sensor array 110 on the shelf 185 is detected, and after each of the individual consumer products 190a-190c detected in the image 170 is bounded by a virtual boundary line 188a-188c, the control circuit 810 of the computing device (or the cloud-based computer vision API) is programmed to process the image 170 shown in FIG. 3 (e.g., by cropping) to create a series of individual reference pressure data images that each include only the pressure data located within a perimeter of one of the virtual boundary line 188a-188c, thereby creating reference bounding box pressure data images for each of the consumer products 190a-190c to facilitate identification of the consumer products 190a-190c in the future. It will be appreciated that, in some embodiments, the control circuit 810 of the computing device 150 (or the cloud-based computer vision API) is programmed to not crop the multi-product image 170 of FIG. 3 to create multiple single product images, but is programmed to leave the image 170 of FIG. 3 as a multi-product image, so that the computer vision model is trained to recognize individual products 190a-190c in a multi-product pressure map image.

In some approaches, the control circuit 810 of the computing device 150 is programmed to analyze localized pressure changes detected by the pressure sensor array 110 as a result of movement of products 190a-190c to identify the individual products 190a-190c. The movement of the products resulting in the pressure changes could be, for example, placement of the products 190a-190c onto the pressure sensor array 110, movement of one of the products 190a-190c on the pressure sensor array 110 to a different location, removal of one or more products 190a-190c from the pressure sensor array 110. In certain implementations, the control circuit 810 of the computing device 150 is programmed to analyze the pressure readings and/or color/dot matrix pressure map images to identify the areas of the pressure sensor array 110 where a change has occurred (e.g., a product was placed onto or removed from the pressure sensor array 110) using the sliding window method (scoring pressure changes in candidate regions over a time objective) and/or the correlated change method (i.e., finding regions with correlated pressure changes over time, scoring the regions, and filtering the regions with non-maximum suppression (NMS)).

In the embodiment of FIG. 9, after the boundary line-bounded reference pressure data images are generated by the computing device (or a computer vision API in communication with the computing device 150 over the network 130), the control circuit 810 is programmed to use these reference bounded images to train machine learning and computer vision models (e.g., convolutional neural network (CNN), recurrent neural network (RNN), long short-term memory (LSTM), feedforward neural network (FFNN), TensorFLow, neural architecture learning, transfer learning, Google AutoML, etc.) to draw virtual boundary lines 188a-188c around consumer products 190a-190c and/or to specifically identify the products 190a-190c based on the pressure values that may be captured in the future by the pressure sensor array 110 when products 190a-190c are placed onto the pressure-sensor array-equipped shelf 185 of the product storage unit 180 in retail facilities and customer homes/businesses (step 960).

In some embodiments, classic computer vision techniques are used to train the computer models for classification and object detection. Generally, this step results in an algorithm whose input is a pressure image 170 from a known pressure image hardware type, and the output is a collection of images 170 with virtual boundary lines (i.e., bounding boxes) 188a-188c around discrete products 190a-190c, and each of the virtual boundary lines 188a-188c being associated with unique identifying data corresponding to the product 190a-190c within the respective virtual boundary lines 188a-188c. In some embodiments, the computing device 150 is configured to use reinforcement learning to optimize architecture configurations of a convolutional neural net with transfer learning from ImageNet, but it will be appreciated that various different object detection algorithms may be used.

In one approach, the control circuit 810 is programmed to process the pressure values obtained from the pressure sensor array 110 to construct reference pressure map images each representative of a single product, such that the control circuit 810 can reliably classify/identify a specific product determined, based on its pressure value reading obtained from the pressure sensor array 110, to be a match for a given pressure map image. The control circuit 810 may be programmed to analyze an image (e.g., image 170 in FIG. 3) having multiple virtual boundary lines 188a-188c enclosing pressure data maps (represented by the illustrated dot matrix shapes) 192a-192c of multiple products 190a-190c, and to generate product-identifying labels for each of the products 190a-190c within each of the virtual boundary lines 188a-188c, in some aspects, stitching together images of pressure maps of products that were placed onto the pressure sensor array-equipped shelf 185 and surrounded with virtual boundary lines 188a-188c individually. In some approaches, the control circuit 810 is programmed to identify each of the products 190a-190c individually at a time when they are placed on the pressure sensor array 110, or as they are removed from the pressure sensor array 110.

In some aspects, the control circuit 810 may be programmed to interpret a detected increase in regional pressure on the pressure sensor array 110 as an indication that one or more products 190a-190c are being added to the shelf 185 and a decrease in regional pressure on the pressure sensor array 110 as an indication that one or more products 190a-190c are being removed from the shelf 185. In one aspect, in response to detecting that a product 190a-190c was added to the shelf 185, the control circuit 810 is programmed to analyze just the area of the pressure sensor array 110 that is associated with a change in pressure values, which is more efficient than having to analyze the pressure values of all of the sensels of the entire pressure sensor array 110.

Notably, some products 190a-190c have many possible orientations. For instance, a ketchup bottle can be placed on its bottom and on its cap. Similarly, products in non-rigid packaging (e.g., grapes) will have many available orientations. Generally, the computer vision models are trained to be able to identify products 190a-190c regardless of their orientation (e.g., normal, on the side, upside-down) on the pressure sensor array 110. The orientation of a product 190a-190c may refer to one or more of: (a) the physical position/location of the product 190a-190c on the pressure sensor array 110; (b) the fill level of the product 190a-190c (e.g., 4 bananas 190a, whole or half an orange 190b, a 20%, 40%, 60%, 80%, or 100% full bottle 190c, a 12 egg carton having from 1 to 12 eggs in it); (c) position of discrete items within the packaging (e.g., grapes, eggs, garbage bags); (d) movement of liquid within packaging; (e) identical items stacked. Notably, variations in any of these orientations may result in a different reading by the pressure sensor array 110. Generally, it is expected that the pressure sensor array 110 will show slightly different readings depending on how the products 190a-190c are placed and oriented on the pressure sensor array 110, but as the products 190a-190c are repeatedly placed in the same orientation and the same spot on the pressure sensor array 110, the variation will be expected to decrease as the number of sensels on the pressure sensor array 110 stored in association with the products 190a-190c become very large. In other words, for each product 190a-190c, the system 100 develops a dataset of pressure map images 170 (with each image 170 containing pressure map data for only one of the products 190a-190c) corresponding to as many as possible available orientations, fill levels, and positions of the products 190a-190c on the pressure sensor array 110.

Figure 4:
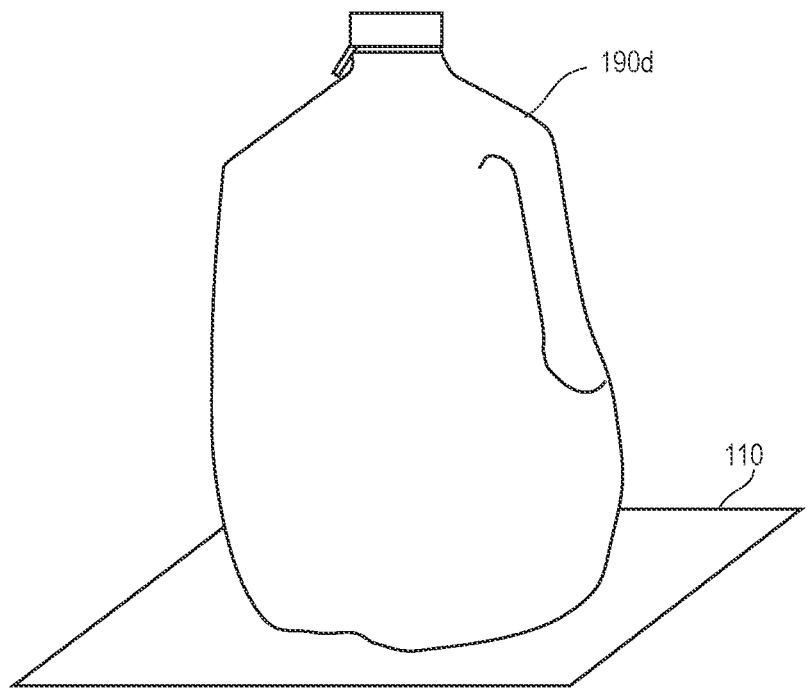
FIG. 4 depicts a perspective view of an exemplary product located on a pressure sensor array.

Over time, as a result of many different consumer products being repeatedly placed onto the pressure sensor array-equipped shelf 185 of the product storage unit 180 (in both the retail store setting, or customer home/business setting), step 960 of the logic flow 900 of FIG. 9 results in a large set of reference pressure image data that is used to train computer vision and machine learning models to detect the presence of and/or identify a large variety of different consumer products 190a-190c, even those consumer products that may have a very similar and even a substantially identical overall shape. In particular, FIGS. 4 and 6 depict two products 190d (drinking water) and 190e (organic milk), respectively, that are stored in containers that have a virtually identical exterior shape. However, when the product 190d is placed onto the pressure sensor array 110 as shown in FIG. 5, the pressure values of the product 190d detected by the pressure sensor array 110 are converted by the computing device 150 into the pressure map image 170 as seen in FIG. 5, and when the pressure values of the product 190e detected by the pressure sensor array 110 are converted by the computing device 150 into the pressure map image 170 as seen in FIG. 7, it can be seen that the pressure map matrix 192d in image 170 of FIG. 5 is different from the pressure map matrix 192e in image 170 of FIG. 7.

Figure 5:
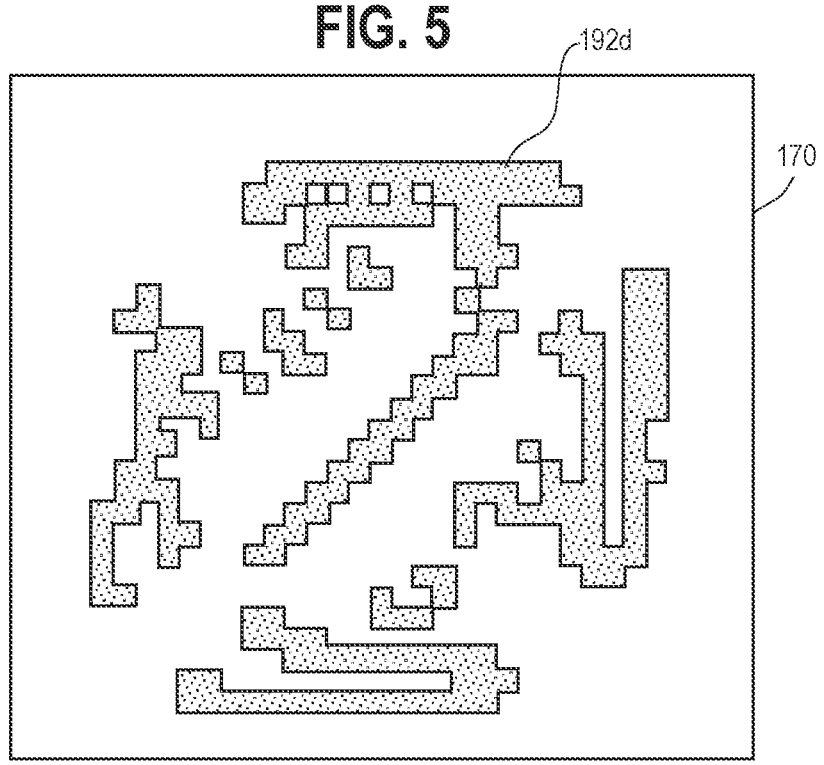
FIG. 5 depicts an exemplary image depicting dot matrix shapes representative of the pressure values exerted by the product of FIG. 4 onto the pressure sensor array of FIG. 4.
Figure 6:
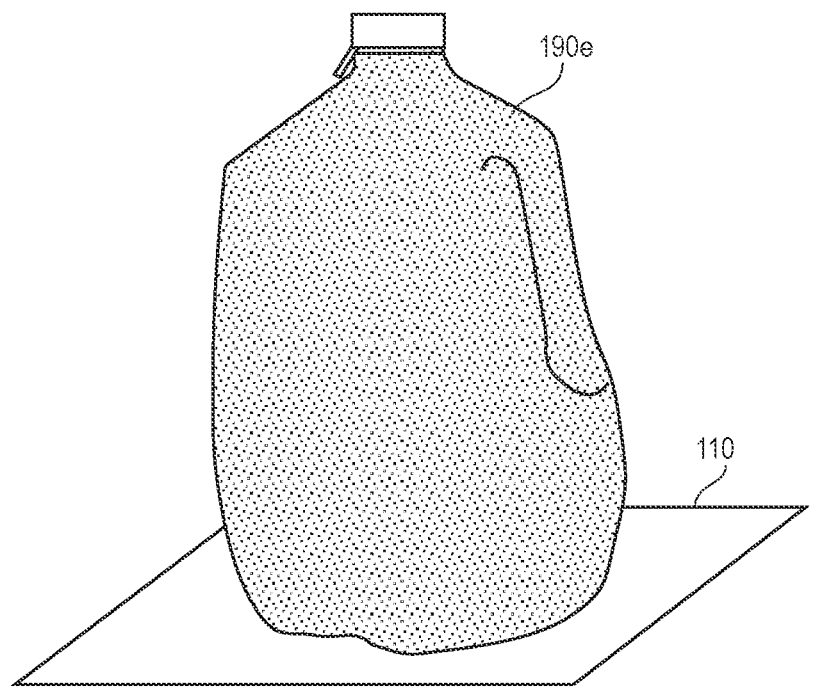
FIG. 6 depicts a perspective view of an exemplary product different from, but having a substantially identical overall shape as, the product of FIG. 4.
Figure 7:
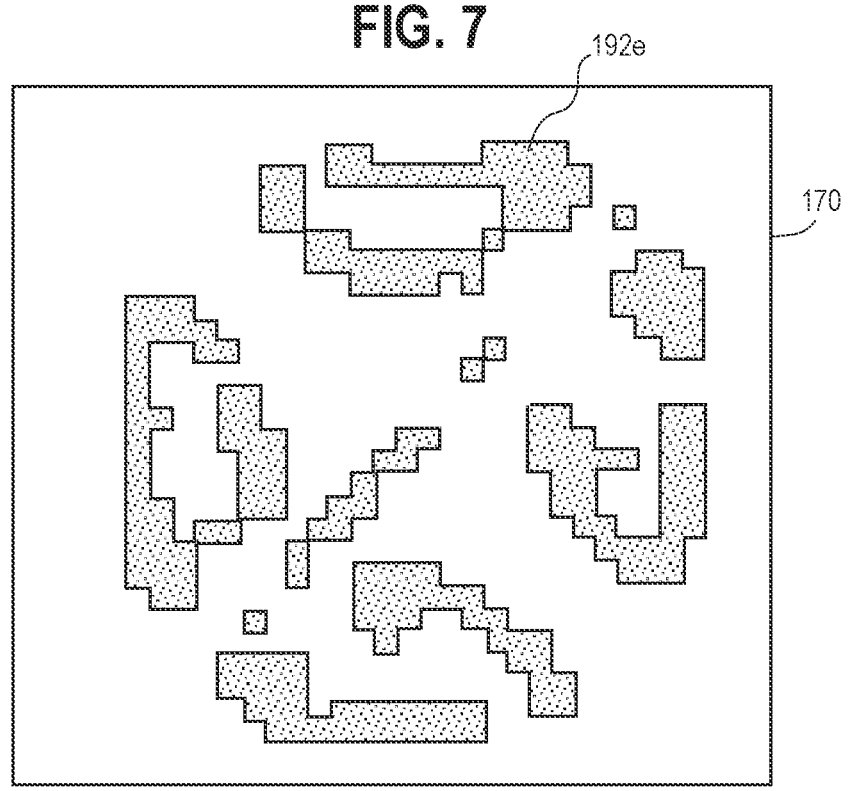
FIG. 7 depicts an exemplary image depicting dot matrix shapes representative of the pressure values exerted by the product of FIG. 6 onto the pressure sensor array of FIG. 6.

In this exemplary case, while the overall shape of the containers of the products 190d and 190e is substantially identical, and the overall weight of the products 190d and 190e is identical, the differences in pressure data measured by the pressure sensor array 110 and the resulting visible differences in the overall shape of the pressure map matrix 192d in FIG. 5 and the pressure map matrix 192e in FIG. 7 may be caused by a different topography of the bottom surface of the containers of the products 190d and 190e, which results in different intensities in pressure values measured by the pressure sensor array 110 across the bottom surface of the containers. As discussed above, the different intensities in pressure values in a reading by the pressure sensor array 110 may be reflected in the image 170 by different pressure map colors (e.g., red color representing a heavy pressure and blue representing light pressure) or different pressure map dot matrix patterns (e.g., a higher concentration of dots representing a heavy pressure and a lower concentration of dots representing a light pressure).

As mentioned above, many products come in containers/packaging having a similar (if not identical) overall shape and size/weight. For such products, absent a different in bottom surface topography (which could result in a pressure distribution variation detectable by the pressure sensor array 110), the pressure values of the products detected by the pressure sensor arrays 110 and the resulting pressure map (color/dot matrix) images may be translated into an identification of a specific product by using the unique identifier (e.g., UPC or SKU) of the product stored in the electronic database 140, or by referring to the order history of the user, which is stored in the electronic database 140. For example, with reference to FIGS. 1-3, if the plastic bottle containing the soft drink product 190c is a 0.5 L bottle of Diet Coke and if it is known that the 0.5 L bottle of regular Coke has an identical bottom surface topography to the Diet Coke bottle, the pressure reading of the bottle taken by the pressure sensor array 110 when the bottle is located thereon (see FIG. 1) and the resulting pressure map matrix 192c (see FIGS. 2-3) of the bottle would not be sufficient to enable the computing device 150 to determine whether the 0.5 L bottle is regular Coke or Diet Coke. However, if the product storage unit 180 is equipped with a sensor (e.g. a camera, UPC scanner, etc.) configured to scan the identifying indicia (e.g. barcode) on the bottle, the computing device 150 could transmit a signal to such a sensor and cause the sensor to scan the bottle in question to obtain its unique identifying indicia, which will enable the computing device 150 to accurately confirm whether the bottle is regular Coke or Diet Coke.

With reference to FIG. 9, after the control circuit 810 of the computing device 150 determines that the machine learning computer vision component of the system 100 is unable to determine the identity of a product with a high degree of certainty (as could be the case with the product 190c), the exemplary logic flow 900 could include the computing device 150 transmitting a query to the electronic database 140 to obtain the product order history of the user in order to determine whether the historical purchases of the user are able to shed light on the identity of the product 190c (step 970). The control circuit 810 of the computing device 150 would then determine whether the object classification reached by the machine learning computer vision model matches a historical purchase of the user (step 975). In the above, example, if, in step 975, the control circuit 810 determines that the product order history of the user obtained by the computing device 150 from the electronic database 140 indicates that the user ordered one or more 0.5 L Diet Coke bottles from the retailer last week and has not ordered a 0.5 L regular Coke bottle in over a year, the control circuit 810 of the computing device 150 would interpret this data as greatly increasing the probability that the bottle detected by the pressure sensor array 110 is a Diet Coke bottle.

If the answer at step 975 is yes, then the control circuit 810 is programmed to identify the weight of the observed product 190c and record the identity of the product 190c and the detected weight of the product 190c in the electronic database 140 in association with the user's profile (step 980). If the answer at step 975 is no, then the control circuit 810 is programmed to determine whether the detected pressure value data corresponds to a stored profile of a user (step 985). If the answer at step 985 is yes, then the control circuit 810 is programmed to identify the weight of the observed product 190c and record the identity of the product 190c and the detected weight of the product 190c in the electronic database 140 in association with the user's profile (step 980). If the answer at step 985 is no, then the control circuit 810 is programmed to store the detected pressure value data in the electronic database 140 with a notation to be evaluated by a worker (step 990).

In some aspects, the reference pressure array data/item mask models for various consumer products 190a-190c detected by the pressure sensor array 110 on the shelf 185 are stored in the electronic database 140 for future retrieval by computing device 150 when processing incoming pressure readings generated by the pressure sensor array 110. Since they are generated via computer vision models trained on hundreds/thousands of pressure values detected by the pressure sensor array 110, the reference pressure array data generated by the computing device 150 (and/or a cloud-based computer vision API) and stored in the electronic database 140 facilitates faster and more precise detection and identification of consumer products 190a-190c based on pressure values received from the pressure sensor array 110.

In particular, in one aspect, the control circuit 810 is programmed to correlate a pressure data set associated with a selected one of the products (e.g., product 190c in FIG. 1) with the reference pressure array data stored in the electronic database 140 to determine whether the reference pressure array data stored in the electronic database 140 includes a reference pressure data model that matches the pressure data set associated with the product 190c. Then, if this correlation indicates a match between the pressure data set associated with product 190c and one of the reference pressure data models stored in the electronic database 140, the control circuit 810 obtains the product identity data (e.g., a barcode or another unique product identifier) stored in the electronic database 140 in association with the reference pressure data model that matches the pressure data set associated with product 190c, thereby determining the identity of product 190c (e.g., 0.5 L Diet Coke bottle). After the identity of the product 190c is determined, the control circuit 810 transmits a signal to the electronic database 140 to update the electronic database 140 such that product identity data uniquely identifying the product 190c is stored in association with the pressure values generated by the pressure sensor array 110 in response to the force exerted onto the pressure sensor array 110 by product 190c.

In certain aspects, after the control circuit 810 of the computing device 150 determines an identity of the product 190c, the control circuit 810 is programmed to correlate the pressure data reading for this product 190c obtained from the pressure sensor array 110 and/or from the electronic database 140 to determine a level of consumption of the selected one of the products. As used herein, the term consumption level refers to a number of units of a given product (e.g., 4, 3, 2, or 1 bananas of product 190a) remaining on the shelf 185, and the amount/volume of a given product (e.g., 25% of the bottle of product 190c, half an orange of product 190b) remaining on the shelf 185. This determination of consumption level can be performed by the control circuit 810 at predefined time intervals (e.g., 5 minutes, 30 minutes, 1 hour, 24 hours, etc.), or could be performed by the control circuit 810 any time when removal of the product 190c from the shelf 185, followed by replacement of the product 190c back onto the shelf 185 is detected by the controller 120. The determination of consumption level of the products 190a-190c by the control circuit 810 enables the control circuit 810 to determine that one or more of the products 190a-190c on the shelf 185 is out of stock, or will soon be out of stock. In some embodiments, the control circuit 810 of the computing device 150 is programmed to automatically reorder the products 190a-190c that are or will soon be out of stock based on the replenishment settings of the user stored in the electronic database 140 in association with the user's profile, as described below.

In some embodiments, the user, using the user's electronic device 160, can enter, modify, and/or update the product replenishment preferences of the user. For example, the user may opt in for automatic replenishment with respect to all of the products 190a-190c previously ordered by the user, or the user may select only certain products 190a-190c to be automatically replenished. In some aspects, the user may be permitted to set predetermined time interval for automatic reordering/replenishment of one or more products 190a-190c previously ordered by the user (e.g., the user may opt in for automatic replenishment of a 12-egg carton on a weekly basis). In other aspects, the user may be permitted to set a replenishment threshold that would trigger an automatic reordering/replenishment one or more products 190a-190c previously ordered by the user when the consumption level of the products 190a-190c reaches a certain threshold (e.g., the user may opt in for automatic replenishment of the product 190a when two bananas (or only one banana) remain on the shelf 185, and automatic replenishment of the product 190c when half or less of the volume of the soft drink remains in the bottle).

In some embodiments, after the control circuit 810 of the computing device identifies a given product (e.g., 190c) on the shelf 185 based on the pressure data generated by the pressure sensor array 110 and determines a consumption level of the product 190c (i.e., the fill percentage of the bottle), the control circuit 810 is programmed to determine (e.g., by querying the user replenishment setting stored in the electronic database 140) whether the detected level of consumption of the product 190c is above or below the product replenishment threshold preset by the user. If the control circuit 810 determines that the detected level of consumption of the product 190c is above the product replenishment threshold preset by the user (e.g., if the product replenishment threshold is 50% consumption and the amount of liquid left in the bottle is less than 50%), the control circuit 810 is programmed to automatically process a replenishment order for the product 190c for delivery to the user. In some embodiments, when a replenishment order is processed by the computing device, the control circuit 810 is programmed to cause the computing device 150 to transmit an electronic notification to the electronic device 160 of the user that includes a confirmation that the replenishment order was processed.

In certain implementations, after preparing a proposed replenishment order for one or more products 190a-190c for the user, the control circuit 810 is programmed to prompt the user and obtain a confirmation from the user that the replenishment order proposed to be generated by the control circuit 810 is approved by the user. For example, the computing device 150 may send a signal to the user electronic device 160 that generates on the electronic device 160 a graphical interface with a virtual shopping cart that permits the user of the electronic device 160 to accept, decline, or modify the proposed replenishment order generated by the control circuit 810. In some aspects, the virtual shopping cart generated on the user electronic device 160 may include a substitute product for the product being reordered with a notification to the user that the previously-ordered product is not available (e.g., out-of-stock, discontinued, or the like).

In some embodiments, the user may be permitted to define a total dollar amount (e.g., $10, $25, $50, etc.) threshold for triggering a delivery of the automatically replenished products 190c-190c to the user. Without wishing to be limited by theory, setting a predefined minimum dollar amount for triggering a delivery to the user may increase efficiency of operations for the retailer by reducing the number of deliveries to the user, since a delivery to the user would not be dispatched in order to replenish just one product 190b (i.e., one orange) consumed by the user, but instead the delivery to the user will include a group of replenishment products.

In some aspects, after the control circuit 810 of the computing device identifies a given product (e.g., 190c) on the shelf 185 based on the pressure data generated by the pressure sensor array 110 and determines that a consumption level of one or more products 190a-190c is above the product replenishment threshold preset by the user, the control circuit 810 is programmed to determine whether a total dollar amount of a replenishment order for such products 190a-190c would exceed the predefined minimum delivery dollar amount threshold. If the answer is yes, then the control circuit 810 is programmed to process the replenishment order for delivery to the user and to cause the computing device 150 to transmit an electronic notification to the electronic device 160 of the user that includes a confirmation that the replenishment order was processed. On the other hand, if the answer is no, the control circuit 810 is programmed to delay processing of the replenishment order for the one or more products 190a-190c until the total dollar amount of the products 190a-190c added to the replenishment order exceeds the minimum total dollar amount required for delivery threshold.

Figure 10:
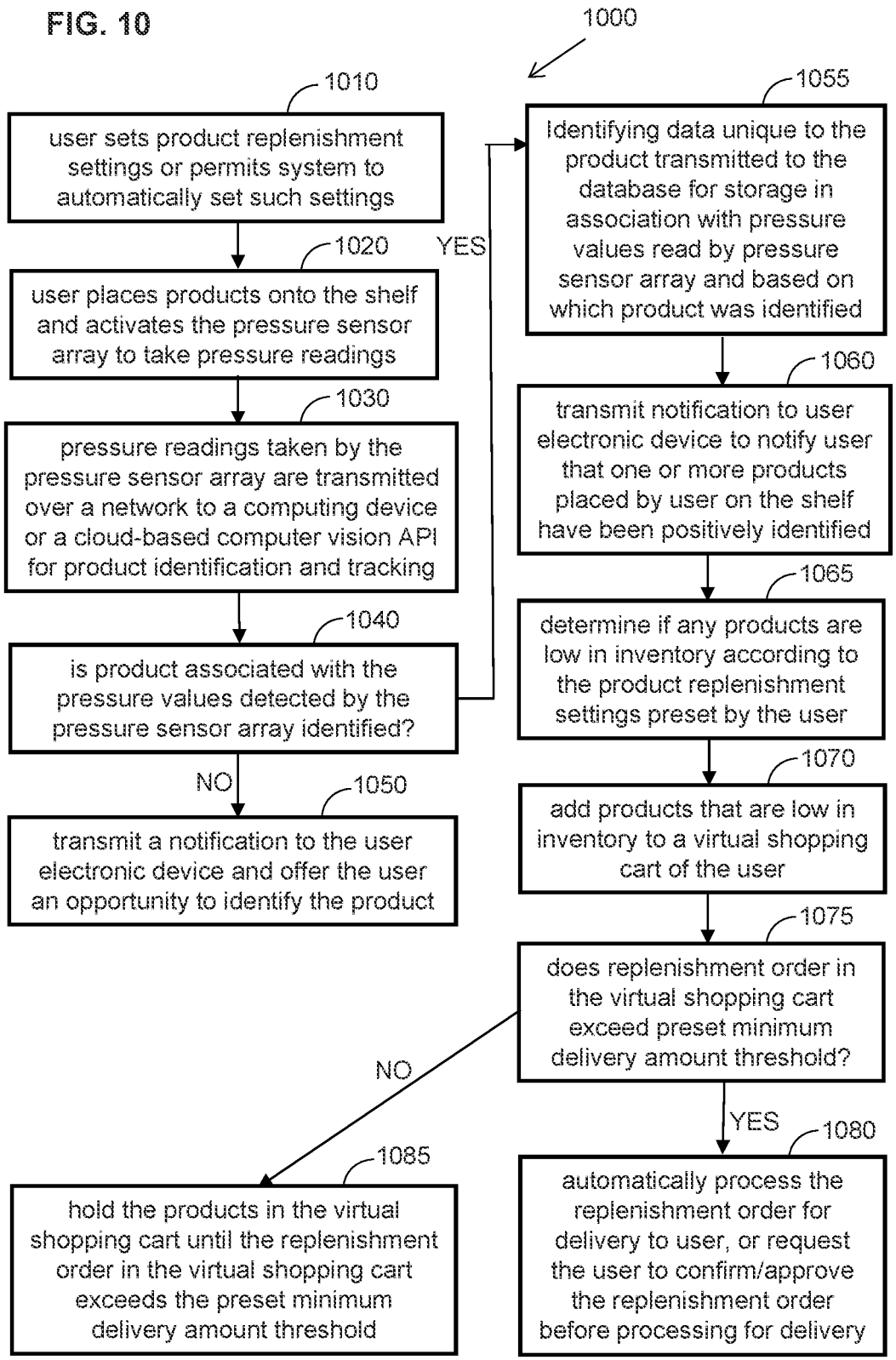
FIG. 10 is a flow chart diagram of an exemplary user-side logic flow when the system of FIG. 1 in accordance with some embodiments is in operation.

FIG. 10 illustrates an exemplary user-side logic flow 1000 when the system 100 is in operation. In step 1010, the user (e.g., an individual or business customer of a retailer, or a retail store in its capacity as a customer of a product distribution center) user a graphical interface generated for the user on the electronic device 160 to set product replenishment settings desired by the customer (or permits the system 100 to automatically set product replenishment settings for the user using machine learning). Generally, the product replenishment settings represent the business rules that the control circuit 810 of the computing device 150 will use to determine when to process product replenishment orders for the user and how many products 190-190c will be included in the product replenishment orders. After the product replenishment settings are defined, the user normally uses the system 100 and places products 190a-190c onto the pressure sensor array-equipped shelf 185 of the product storage unit 180, thereby activating the pressure sensor array 110 to take pressure readings when products 190a-190c when products are placed thereon and removed therefrom (step 1020).

In the embodiment shown in FIG. 10, at step 1030, after the pressure sensor array 110 takes a pressure reading in response to one or more products 190a-190c being placed onto the shelf 185 or removed from the shelf 185, these pressure readings are transmitted by the pressure sensor array 110 over the network 130 to the computing device 150 or to a cloud-based computer vision API for product identification and tracking (i.e., consumption/fill level analysis). At step 1040, a determination is made by the control circuit 810 of the computing device 150 as to whether one or more products 190a-190c associated with the pressure values detected by the pressure sensor array 110 have been identified with a degree of confidence that exceeds a preset threshold. If the answer is no, then the control circuit 810 of the computing device 150 is programmed to transmit an electronic notification over the network 130 to the user electronic device 160, generated on the electronic device 160 a graphical interface (e.g., an electronic message, a notification prompt, a menu of options, etc.) that permits the user to identify one or more products 190a-190c that have not been positively identified by the computer vision system (step 1050).

After the one or more products 190a-190c are identified based on the pressure value readings generated by the pressure sensor array 110, the logic flow 1000 includes transmitting (e.g., from the computing device 150) the product identity data unique to the identified products 190a-190 to the electronic database 140 for storage (and future retrieval) in association with pressure values generated by pressure sensor array 110 and based on which the product was identified (step 1055). In the embodiment illustrated in FIG. 10, the logic flow 1000 includes the computing device 150 transmitting a notification to the electronic device 160 to notify the user that one or more products 190a-190c placed by the user onto the shelf 185 have been positively identified (step 1060). In step 1065 of the exemplary logic flow 1000, the computing device 150, after identifying the one or more products 190a-190c based on the pressure value readings generated by the pressure sensor array 110, analyzes the pressure values associated with the identified products 190a-190c to determine a consumption level (e.g., quantity, fill level, etc.) of the products 190a-190c to determine whether there are any products that are low in inventory according to the product replenishment settings preset by the user in step 1010.

With reference to FIG. 10, if one or more products 190a-190c are determined by the control circuit 810 of the computing device 150 to be low in inventory according to the product replenishment order-triggering thresholds preset by the user, the control circuit 810 of the computing device 150 causes such products 190a-190c to be added to a virtual shopping cart of the user (step 1070). If none of the products 190a-190c are determined to be low in inventory, the logic flow 1000 reverts back to step 1020, when the system 100 awaits for products 190a-190c to be placed onto or removed from the pressure sensor array 110 on the shelf 185. In the illustrated embodiment, after one or more products 190a-190c are added to the virtual shopping cart of the user, the control circuit 810 of the computing devices 150 determines whether a total dollar amount of a replenishment order based on the products 190a-190c added to the virtual shopping cart would exceed the predefined minimum delivery dollar amount threshold (step 1075).

If the answer is yes, then the control circuit 810 automatically processes the replenishment order for delivery to the user, or transmits over the network 130 to the electronic device 160 of the user a request for the user to confirm/approve the replenishment order before the delivery order is processed (step 1080). As mentioned above, in some embodiments, the computing device 150 transmits an electronic notification to the electronic device 160 of the user that includes a confirmation that the replenishment order was processed. With reference back to FIG. 10, if the answer at step 1075 is no, the control circuit 810 delays processing of the replenishment order for the one or more products 190a-190c and holds the products 190a-190c in the virtual shopping cart until the total dollar amount of the products 190a-190c in replenishment order exceeds the minimum total dollar amount required for delivery threshold (step 1085).

The above-described exemplary embodiments of the methods and systems of identifying, tracking usage of, and replenishing products on a shelf of a product storage unit advantageously provide a scalable solution for collecting pressure value data sufficient to enable precise detection of a large variety of consumer products on shelves of consumer product storage units and for precise identification of the detected consumer products. As such, the systems and methods described herein provide for an efficient and precise monitoring of on-shelf product inventory (both in the retail store and customer in-home environment) as well as real-time consumption of on-shelf products, and enable timely replenishment of the on-shelf inventory by facilitating product reorders, thereby providing a significant boost in revenue to a retailer.

Those skilled in the art will recognize that a wide variety of other modifications, alterations, and combinations can also be made with respect to the above-described embodiments without departing from the scope of the invention, and that such modifications, alterations, and combinations are to be viewed as being within the ambit of the inventive concept.

What is claimed is:

1. A system for identifying, tracking usage of, and replenishing products on a shelf of a product storage unit, the system comprising:
 a pressure sensor array positioned on the shelf and configured to detect forces exerted on the pressure sensor array by each of the products located on the shelf;
 an electronic database configured to store reference pressure array data representative of a reference pressure data model relative to each of the products;

a computing device in communication with the pressure sensor array and the electronic database;

the reference pressure data model for a selected one of the products being generated via training, by the computing device, of a machine learning model using pressure data generated on the pressure sensor array by a reference product substantially identical to the selected one of the products when the reference product is at a plurality of consumption levels;

each reference pressure data model generated via training of the machine learning model being associated in the electronic database with product identity data that identifies a product corresponding to the reference pressure data model; and the computing device including a processor-based control circuit configured to:

activate the pressure sensor array to cause the pressure sensor array to generate a pressure reading for the selected one of the products when the selected one of the products is positioned on the pressure array;

obtain a pressure data set associated with the selected one of the products and captured by the pressure sensor array when the selected one of the products was positioned on the pressure sensor array;

process the pressure data set associated with the selected one of the products and captured by the pressure sensor array when the selected one of the products was positioned on the pressure sensor array by generating a boxed pressure data set, where a virtual bounding box extends around the pressure data set associated with the selected one of the products;

correlate the boxed pressure data set associated with the selected one of the products with the reference pressure array data stored in the electronic database;

in response to a determination by the control circuit that the reference pressure array data stored in the electronic database includes a reference pressure data model generated via the training of the machine learning model that matches the boxed pressure data set associated with the selected one of the products, obtain the product identity data stored in the electronic database in association with the reference pressure data model that matches the boxed pressure set associated with the selected one of the products to determine an identity of the selected one of the products; and in response to a determination by the control circuit that the reference pressure array data stored in the electronic database does not include the reference pressure data model generated via the training of the machine learning model does not match the boxed pressure data set associated with the selected one of the products:

cause the selected one of the products to be scanned by a sensor configured to scan identifying indicia on the selected one of the products;

obtain the identifying indicia scanned by the sensor and, based on a determination of the identity of the selected one of the products, generate product identity data identifying the selected one the products;

update the trained machine learning model that is stored in the electronic database associated with the selected one of the products such that an updated machine learning model includes the an updated boxed pressure set associated with the selected one of the products the identity of which was determined based on the scan of the identifying indicia of the selected one of the products; and identify, by the updated machine learning model, a subsequent product identical to the selected one of the products based on a match between the pressure data generated on the pressure sensor array by the subsequent product when the subsequent product is located on the shelf and the updated boxed pressure set included in the updated machine learning model.

2. The system of claim 1, wherein the product-storing unit comprises a refrigerator, a freezer, a cabinet, a cupboard, a pantry, and a shelving structure.

3. The system of claim 1, wherein the electronic database further comprises electronic data representative of: pressure data sets previously obtained by the pressure sensor array, identity of the products on or likely to be on the shelf, relative orientation of the products on the shelf, price of the products, unit weight of each of the products, unit volume of each of the products, sensor configuration, relative sensor location, and unit quantity of each of the products.

4. The system of claim 1, wherein, based one or more pressure data sets obtained by the computing device from the pressure sensor array, the control circuit of the computing device is configured to determine that:

the selected one of the products is no longer positioned on the pressure sensor array; or the selected one of the products was moved to a different location on the pressure sensor array.

5. The system of claim 1, wherein, based on a determination of the identity of the selected one of the products by the control circuit of the computing device, the control circuit is programmed to correlate the pressure data set associated with the selected one of the products with the reference pressure array data stored in the electronic database that matches the selected one of the products to determine a level of consumption of the selected one of the products.

6. The system of claim 5, wherein the electronic database further comprises product replenishment threshold settings associated with a user; and wherein the control circuit of the computing device is configured, in response to a determination, by the computing device, that the level of consumption of the selected one of the products is above the product replenishment threshold, to:

automatically process a replenishment order for the selected one of the products for delivery to the user; and cause transmission of an electronic notification to an electronic device of the user, the electronic notification including a confirmation that the replenishment order was processed.

7. The system of claim 6, wherein the electronic database further comprises a minimum total dollar amount threshold for triggering a delivery of the replenishment order; and wherein the control circuit of the computing device is configured to:

automatically process the replenishment order for the selected one of the products in response to a determination, by the computing device, that the minimum total dollar amount threshold is exceeded; and in response to a determination, by the computing device, that the minimum total dollar amount threshold is not exceeded, delay processing the replenishment order for the selected one of the products until products are added to the replenishment order such that the minimum total dollar amount threshold of the replenishment order is exceeded.

8. The system of claim 5,
wherein the electronic database further comprises product replenishment threshold settings associated with a user; and
wherein the control circuit of the computing device is configured, in response to a determination, by the computing device, that the level of consumption of the selected one of the products is above the product replenishment threshold, to:
generate a proposed replenishment order for the selected one of the products for delivery to the user; and
cause transmission of an electronic notification to an electronic device of the user, the electronic notification being configured to generate a virtual shopping cart on the electronic device, the virtual shopping cart being configured to permit the user of the electronic device to accept, decline, or modify the proposed replenishment order generated by the control circuit.

9. A method for identifying, tracking usage of, and replenishing products on a shelf of a product storage unit, the method comprising:
providing a pressure sensor array positioned on the shelf and configured to detect a force exerted on the pressure sensor array by each of the products located on the shelf;
providing an electronic database configured to store reference pressure array data representative of a reference pressure data model relative to each of the products;
providing a computing device in communication with the pressure sensor array and the electronic database;
the reference pressure data model for a selected one of the products being generated via training, by the computing device, of a machine learning model using pressure data generated on the pressure sensor array by a reference product substantially identical to the selected one of the products when the reference product is at a plurality of consumption levels;
each reference pressure data model generated via training of the machine learning model being associated in the electronic database with product identity data that identifies a product corresponding to the reference pressure data model; and
by the computing device:
activating the pressure sensor array to cause the pressure sensor array to generate a pressure reading for the selected one of the products when the selected one of the products is positioned on the pressure array;
obtaining a pressure data set associated with the selected one of the products and captured by the pressure sensor array when the selected one of the products was positioned on the pressure sensor array;
processing the pressure data set associated with the selected one of the products and captured by the pressure sensor array when the selected one of the products was positioned on the pressure sensor array by generating a boxed pressure data set, where a virtual bounding box extends around the pressure data set associated with the selected one of the products;
correlating the boxed pressure data set associated with the selected one of the products with the reference pressure array data stored in the electronic database;
in response to a determination by the control circuit that the reference pressure array data stored in the electronic database includes a reference pressure data model generated via the training of the machine learning model that matches the boxed pressure data set associated with the selected one of the products, obtaining the product identity data stored in the electronic database in association with the reference pressure data model that matches the boxed pressure set associated with the selected one of the products to determine an identity of the selected one of the products; and
in response to a determination by the control circuit that the reference pressure array data stored in the electronic database does not include the reference pressure data model generated via the training of the machine learning model does not match the boxed pressure data set associated with the selected one of the products:
causing the selected one of the products to be scanned by a sensor configured to scan identifying indicia on the selected one of the products;
obtaining the identifying indicia scanned by the sensor and, based on a determination of the identity of the selected one of the products, generate product identity data identifying the selected one the products;
updating the trained machine learning model that is stored in the electronic database associated with the selected one of the products such that an updated machine learning model includes an updated boxed pressure set associated with the selected one of the products the identity of which was determined based on the scan of the identifying indicia of the selected one of the products; and
identifying, by the updated machine learning model, a subsequent product identical to the selected one of the products based on a match between the pressure data generated on the pressure sensor array by the subsequent product when the subsequent product is located on the shelf and the updated boxed pressure set included in the updated machine learning model.

10. The method of claim 9, wherein the product-storing unit comprises a refrigerator, a freezer, a cabinet, a cupboard, a pantry, and a shelving structure.

11. The method of claim 9, wherein the electronic database further comprises electronic data representative of: pressure data sets previously obtained by the pressure sensor array, identity of the products on or likely to be on the shelf, relative orientation of the products on the shelf, price of the products, unit weight of each of the products, unit volume of each of the products, sensor configuration, relative sensor location, and unit quantity of each of the products.

12. The method of claim 9, wherein, based one or more pressure data sets obtained by the computing device from the pressure sensor array, determining, by the control circuit of the computing device that:
the selected one of the products is no longer positioned on the pressure sensor array; or
the selected one of the products was moved to a different location on the pressure sensor array.

13. The method of claim 9, further comprising, based on a determination of the identity of the selected one of the products by the control circuit of the computing device, correlating, via the control circuit of the computing device, the pressure data set associated with the selected one of the products with the reference pressure array data stored in the electronic database that matches the selected one of the products to determine a level of consumption of the selected one of the products relative to a unit of the selected one of the products when unopened or unconsumed.

14. The method of claim 13,
wherein the electronic database further comprises product replenishment threshold settings associated with a user; and
in response to a determination, by the computing device, that the level of consumption of the selected one of the products is above the product replenishment threshold, by the control circuit of the computing device:
automatically processing a replenishment order for the selected one of the products for delivery to the user; and
causing transmission of an electronic notification to an electronic device of the user, the electronic notification including a confirmation that the replenishment order was processed.

15. The method of claim 14,
wherein the electronic database further comprises a minimum total dollar amount threshold for triggering a delivery of the replenishment order; and
further comprising, by the control circuit of the computing device:
automatically processing the replenishment order for the selected one of the products in response to a determination, by the computing device, that the minimum total dollar amount threshold is exceeded; and
in response to a determination, by the computing device, that the minimum total dollar amount threshold is not exceeded, delaying processing the replenishment order for the selected one of the products until products are added to the replenishment order such that the minimum total dollar amount threshold of the replenishment order is exceeded.

16. The method of claim 13,
wherein the electronic database further comprises product replenishment threshold settings associated with a user; and
further comprising, by the control circuit of the computing device and in response to a determination, by the computing device, that the level of consumption of the selected one of the products is above the product replenishment threshold:
generating a proposed replenishment order for the selected one of the products for delivery to the user; and
causing transmission of an electronic notification to an electronic device of a user, the electronic notification being configured to generate a virtual shopping cart on the electronic device, the virtual shopping cart being configured to permit the user of the electronic device to accept, decline, or modify the proposed replenishment order generated by the control circuit.

\* \* \* \* \*

UNITED STATES PATENT AND TRADEMARK OFFICE
CERTIFICATE OF CORRECTION

PATENT NO.       : 12,400,182 B2                           Page 1 of 1
APPLICATION NO.  : 18/381497
DATED            : August 26, 2025
INVENTOR(S)      : Elizabeth J. Barton et al.

It is certified that error appears in the above-identified patent and that said Letters Patent is hereby corrected as shown below:

In the Claims

In Column 21, Claim 1, Line 66, delete "the an" and insert -- an --, therefor.

In Column 22, Claim 4, Line 25, delete "based one" and insert -- based on one --, therefor.

In Column 24, Claim 12, Line 54, delete "based one" and insert -- based on one --, therefor.

Signed and Sealed this
Fourteenth Day of October, 2025

John A. Squires
*Director of the United States Patent and Trademark Office*